United States Patent
HomChaudhuri

(10) Patent No.: US 7,761,122 B2
(45) Date of Patent: Jul. 20, 2010

(54) SYSTEM FOR IMPROVING OVERALL BATTERY LIFE OF A GSM COMMUNICATION DEVICE

(75) Inventor: Sandip HomChaudhuri, Bangalore (IN)

(73) Assignee: Samsung Electronics Co., Ltd (KR)

( * ) Notice: Subject to any disclaimer, the term of this patent is extended or adjusted under 35 U.S.C. 154(b) by 735 days.

(21) Appl. No.: 11/647,709

(22) Filed: Dec. 29, 2006

(65) Prior Publication Data
US 2007/0184836 A1    Aug. 9, 2007

(30) Foreign Application Priority Data
Dec. 30, 2005   (IN) ................. 1987/CHE/2005
Nov. 15, 2006   (KR) ................. 10-2006-0112786

(51) Int. Cl.
*H04M 1/00*    (2006.01)
(52) U.S. Cl. .............. 455/574; 455/550.1; 455/434; 370/318
(58) Field of Classification Search ............. 455/574, 455/522, 69, 425, 550.1–553.1, 556.2, 434, 455/515; 370/311, 318, 332, 321, 336, 337, 370/343
See application file for complete search history.

(56) References Cited

U.S. PATENT DOCUMENTS

| | | | |
|---|---|---|---|
| 5,794,146 A | 8/1998 | Sevcik et al. | |
| 6,252,868 B1 | 6/2001 | Diachina et al. | |
| 6,292,660 B1 | 9/2001 | Hartless et al. | |
| 6,526,286 B2 | 2/2003 | Wan | |
| 2002/0082010 A1 | 6/2002 | Koorapaty et al. | |
| 2004/0136392 A1* | 7/2004 | Diachina et al. | 370/431 |
| 2004/0229659 A1* | 11/2004 | Boos et al. | 455/574 |
| 2005/0096053 A1 | 5/2005 | Liu et al. | |

FOREIGN PATENT DOCUMENTS

| | | |
|---|---|---|
| EP | 1 069 794 | 1/2001 |
| EP | 1 313 336 | 5/2003 |
| GB | 2 346 293 | 8/2000 |
| KR | 1020050015746 | 2/2005 |
| WO | WO 01/60103 | 8/2001 |

* cited by examiner

*Primary Examiner*—Kamran Afshar
(74) *Attorney, Agent, or Firm*—The Farrell Law Firm, LLP

(57) ABSTRACT

Disclosed is a system for improving the overall battery life of a GSM device according to an optimization mechanism for suspending neighbor-cell scanning in a GSM wireless communication system, the system having a wireless device including: (a) a Central Processing Unit (CPU) executing software programs intended to comply with GSM protocol specifications; (b) an RF transmission unit and an RF reception unit functioning either independently or as a single unit; (c) a specialized Digital Signal Processor being able to process received signal at a corresponding receiving antenna and offering estimates of the received signal level and quality; (d) a logic process by which the mobile terminal powers off an RF module thereof for a definite period of time and wakes up at a pre-determined interval to listen to paging messages transmitted thereto; and (e) firmware/software performing neighbor cell monitoring in compliance with a protocol mandated by GSM standards.

19 Claims, 9 Drawing Sheets

IDEAL CELLS                    FICTITIOUS CELLS

SYSTEM FOR IMPROVING OVERALL BATTERY LIFE OF A GSM COMMUNICATION DEVICE

PRIORITY

This application claims priority to applications entitled "System for Improving Overall Battery Life of a GSM Communication Device" filed in the India Patent Office on Dec. 30, 2005 and assigned Serial No. 1987/CHE/2005, and filed in the Korean Intellectual Property Office on Nov. 15, 2006 and assigned Serial No. 2006-112786, the contents of which are incorporated herein by reference.

BACKGROUND OF THE INVENTION

1. Field of the Invention

This invention relates to a wireless communication system, and more particularly to a system for improving the overall battery life of a mobile terminal based on the GSM (Global System for Mobile Communication) Radio Access Technology.

2. Description of the Related Art

Nowadays, due to the technological advance and cost curtailment of a wireless cellular phone, wireless phones are no longer a luxury, but are an absolute necessity. Without wireless cellular phones, billions of people all around the world cannot even visualize performing their daily chores and managing their personal/official life. Thanks to GSM, the radio access technology that has changed the life way, people communicate and remain connected in their otherwise hectic daily schedule. GSM is governed by a set of protocols, which are mutually understood by each User Equipment (hereinafter referred to as "UE") and the NW (Network/Operator which provides the service) with which it communicates.

GSM is built upon the concept of cellular technology, which divides a given region into a number of "cells". FIG. 1 indicates the overall GSM system in use. Referring to FIG. 1, we can see the various network elements which together constitute the GSM communication system. The Network Sub System ("NSS") Domain is responsible for all network control decisions. Base Station Subsystem ("BSS") Domain is responsible for controlling the connectivity with the end-user terminals. In the following discussion, we will describe the BSS in more detail. Inside the BSS, several "cells" and a Base station Controller (BSC) are included. Each of these cells caters to a group of end-user terminals. All these cells are connected with the BSC. That is, the BSC manages a plurality of cells in one BSS and controls reselections and handovers between cells.

FIG. 2 illustrates the architecture of a cell, in detail. These cells are service areas; each equipped with a Radio Frequency ("RF") transmitter and an RF receiver. They are commonly constructed within a BTS (Base Transceiver Station). Each of these cells is designed to support a fixed set of UE's and has a region over which it can provide acceptable service.

These cells are designed to overlap their service areas so that there is no "No Service" region remaining, as indicated in FIG. 3, where an ideal cell and a fictitious cell are illustrated. A fictitious cell, used for purpose of mathematical computations, has pure hexagonal shape and has well-defined boundaries, without any overlap. In reality, however, this is not the case and the ideal cells do have overlapped coverage areas.

Cell Reselection Process:

At any point of time, the mobile terminal is catered to by one unique 'cell BTS'. As the mobile terminal wanders in the region, the quality of service provided by the currently serving cell might deteriorate, for reasons that include the UE moving to the boundary of the current cell or an obstruction in the reception of signal due to an un-even terrain. Under such circumstances, the UE might "camp" on the adjacent cell where it is able to receive better signal and thus can decode downlink information at a more acceptable success rate. This process is called "Cell Reselection". At any point of time, the UE can have a maximum of 32 neighboring cells, as dictated by the protocol specifications.

This cell reselection process is indicated in FIG. 4. Referring to FIG. 4, as the cell draws close to the boundary of the "Rockville cell", the signal strength and/or signal to noise ratio will decrease and might result in some deterioration of the received message. That is when the mobile terminal reselects to the "Bethesda cell". The "Rockville cell", as part of its system information parameters, sends the list of all the neighbor cells which any UE present in its area must monitor.

To this end, the UE, during its time in the current serving cell, must monitor and determine which the neighboring cells are. Furthermore, it also needs to know which one, among all the neighboring cells, has the best 'received signal level' strength. This process is called "Neighbor Cell Monitoring".

Standby Time of Battery and RF Reception in Idle Mode:

A large amount of battery power is used in the process of monitoring the neighboring cells and keeping the database of neighboring cells updated, as stated above. In fact, the process of RF reception to monitor the neighbor cells, in idle mode, is probably the most severe contributing cause for high average current drain. This directly impacts the average standby time of the UE, as evident from Equation (1) below:

$$\text{Standby Time} = \frac{\text{Battery Capacity in miliampere hours}}{\text{Average Current in milliampere}} \quad (1)$$

Referring to Formula (1), even a minor reduction from 0.5 to 1.0 milliampere can produce an improvement of standby life by ~20 to ~40 hours, using an 800 mA-hour battery.

The idle mode RF reception can be expressed in Equation (2) below:

RF reception in idle mode=(RF reception of serving cell paging channel)+(RF reception of neighbor cell broadcast channels)  (2)

Discontinuous Reception, DRX:

In conventional systems, an attempt has been made to mitigate the problem of battery drain by mandating an optimized approach called "DRX", whereby the UE is no longer required to monitor all the continuous occurrences of paging channel in the serving cell. It introduced the concept of a paging group, whereby every UE is part of a particular group. The UE is able to autonomously decide its own Paging Group based on some well-known parameters. With this segmentation in place, the NW is able to send Paging Messages for an entire group at specific intervals. The interval period is informed to all UE's in a given cell as part of the cell information. Now the UE no longer needs to monitor all the Paging Channels; but only when it knows that its own paging group is scheduled. Thus, for the remaining period, the UE can shut down the RF reception unit.

Neighbor Cell Scanning with DRX:

To ensure that the performance of the UE is not degraded and "cell reselection" process is not adversely affected, the UE, at each wake-up, also schedules the monitoring of the neighboring cells and updates its neighboring cell information database. Due to processor speed and timing constraints, the UE schedules the monitoring of 6 to 8 neighbor cells every time it wakes up. Typically 7 cells are monitored, as suggested by the protocol standards. After all the neighboring cells have been monitored, up to a maximum of 32, the UE maintains a sorted list of the six best cells. The sorting is done in terms of received signal level only. This updated list enables the UE to make quick shifts to a neighbor cell whenever the service quality of the current cell falls below an acceptable limit.

Mechanism to Reduce Neighbor Cell Scanning in Idle Mode:

Certain aspects of conventional systems have attempted to cut down the scanning of neighbor cells, thereby RF reception, based on received signal level and received signal quality of serving cell; their fluctuations and the rate of fluctuations; vehicular speed estimation of the UE by making use of sensors and finally decides whether the UE can avoid the scanning of the neighbor cells. Conventional schemes base their decision to scan neighbor cells based on the speed of the UE and what the UE perceives at its antenna. An UE with lower speeds need less scanning of neighbor cells. UE with high fluctuation in the raw signal parameters will resort back to the normal behavior and will not attempt to reduce the neighbor cell scanning.

U.S. Pat. No. 6,526,286 monitors variations of raw signal parameters (e.g., RSSI, SNR); estimating vehicular speed to decide if the frequency of neighbor cell scanning could be reduced.

U.S. Pat. No. 6,292,660, suggests an adaptive site scanning based on the fading rate of the received signal level. The frequency of site scanning has been suggested to be proportional to the fading rate. An increased fading rate increases the rate of site scanning. Yet again, this conventional system attempts to conserve battery by monitoring the fluctuations of raw signal parameters and vehicular speed estimation.

U.S. Patent Publication No. 20050096053, outlines a method whereby the "Ec/Io" or the SNR of the serving cell is being monitored and checked if it is above a certain predefined range, its variations have been monitored to finally decide if the frequency of neighbor cell scanning could be reduced.

As with the previous ones, this conventional system suffers from similar drawbacks thereby providing sub-optimal results. As an example, all the above systems would stop the battery conservation procedure if the signal level or quality fluctuates heavily or if the SNR falls below the threshold range.

Reuse and Co-Channel Interference:

As an introduction, it is also mentioned here that due to a limited number of ARFCNs (Absolute Radio Frequency Channel Numbering) granted to an NW operator, the NW operator uses a set of unique frequencies in a group of cells after which the same set of frequencies is re-used at a certain distance. This concept is shown in FIG. 5 with a cluster size of seven. FIG. 5 illustrates a network configuration where a set of seven frequencies, numbered 1 through 7, are re-used to form a meshed network. This set of cells where a unique set of ARFCNs is used is called "Cluster Size—K" and the distance at which the re-use occurs is called "Reuse Distance—D". This re-use distance is kept such that the signal interference caused by like-frequencies is below tolerant limits.

Given the cell radius (R), and the cluster size (K), the re-use distance can be ideally calculated using the following Equation (3):

$$D = \sqrt{3sKsR} \qquad (3)$$

FIG. 6 illustrates this concept. Referring to FIG. 6, co-channel interference is the scenario which occurs when signals corresponding to one of the neighboring cells of the UE interferes with signals of the same frequency that are being re-used in the adjacent cluster as a different cell. Standard equations known in the art are also used to determine the cluster size.

Therefore, there is a need to provide an optimized cell search method for increasing the overall battery life of a mobile terminal within the parameters of the GSM radio access technology.

SUMMARY OF THE INVENTION

Accordingly, the present invention has been made to solve at least the above-mentioned problems occurring in the conventional systems, and an object of this invention is to provide a system for improving the overall battery life of a GSM communication device that ensures that the battery drain is reduced by allowing the UE intelligently monitor neighboring cells on an "as-needed" basis, with minimal impact to the UE reselection performance.

It is another object of the invention to provide a system for improving the overall battery life of a GSM communication system, which reduces the frequency of cell reselections and indirectly saves battery life.

It is yet another object of the invention to provide a system for improving the overall battery life of a GSM communication device that which mitigates the power drain by avoiding un-necessary re-confirmation of the BSIC for the six best cells every 30 seconds during the time the UE is present in the same cell.

It is still yet another object of the invention to provide a system for improving the overall battery life of a GSM communication device, by which the UE will make cell re-selection decision which strives to take the UE to a cell, out of a plurality of neighbor cells, which is not only better than the current cell from the perspective of received signal level but also allows the UE to make RF transmissions at a lower power level.

It is still yet another object of the invention to provide a system for improving the overall battery life of a GSM communication device that which has a mechanism to strike a balanced trade-off between reselection performance and battery drain that would result in improved standby time of the UE with absolutely minimal reselection effects.

It is still yet another object of the invention to provide a system for improving the overall battery life of a GSM communication device, which enhances wireless communication system by improving the overall battery life of the UE, not just the standby battery life, but with minimal changes in the UE-NW (User Equipment Network) interface.

An embodiment of the invention relates to the UE making use of a running DSC counter as the new measuring yardstick for making decisions as to whether to suspend neighbor cell scanning and the associated behavior. The running DSC counter is a good measure of the UE's ability to meet process goals.

Another embodiment of the invention allows the UE to select the decrement/increment interval of this running DSC counter, allowing flexibly during the course of optimization, i.e., when the UE has started the scan suspension procedure by satisfying the scan suspension criterion. The UE will resort to the default intervals on termination of the process.

Yet another embodiment of the invention relates to defining a threshold parameter DSC_MIN_DROP for the drop of running DSC counter, depending on the paging periodicity, BS_PA_MFRMS, as defined by the implementer, as described below.

An embodiment of the invention defines two threshold parameters RXLEV_MIN and SNR_MIN, which represent the optimization floor value for the last received signal level and the signal to noise ratio. The invention expects the optimization process to continue as long as the latest received signal level and SNR is at least above the floor values. These two parameters act as predictors and serve to indicate to the UE about the degradation in service and an imminent loss of service. No attempt is made in the scan suspension criterion to monitor the fluctuation of the received signal level or SNR.

Another embodiment of the invention defines a threshold parameter MAX_WAIT, which represents the number of attempts/instances the UE is going to tolerate the above embodiment to be unfavorable.

An embodiment of the invention defines a threshold parameter MAX_SUCCESSIVE_FAILURE_COUNT, which represents the maximum attempts of failure of the UE to meet the process goal, i.e. to read the paging message successfully. The choice of this threshold is based on the paging periodicity, BS_PA_MFRMS, as defined by the skilled implementer, as described below.

Another embodiment of the invention defines a threshold parameter MAX_FLUCTUATION_COUNT, which represents the maximum attempts of fluctuation; not of the raw signal level or SNR as exemplified in conventional systems, but of the UE's ability to meet the process goal. In other words, the fluctuation of UE's ability to read the paging data at the periodic intervals is monitored now. This embodiment serves to absorb the spikes and shocks of raw parameters experienced at the UE's antenna and thereby pave the way for a generic solution for all UEs of variant makes, irrespective of RF antenna sensitivity etc., which varies from UE to UE and from one manufacturer to another.

An embodiment of the invention defines a threshold parameter MAX_STALE_NCELL_DATA_TIMER, which represents the maximum time the UE is allowed to not keep the database of neighbor cells updated. The selection of this value can be made adaptive based on the desired amount of optimization as can be seen from the judgment in the detailed description section that follows. A forced update will ensue on exceeding this maximum time. This embodiment opens up a reselection window to the higher layers of the GSM protocol standards and enables the higher layers to make reselections during this time. For all other times, when the scan suspension criterion is satisfied, the reselection window is kept closed. This embodiment helps to balance the battery optimization with the reselection performance.

The present invention makes use of the above embodiments and defines a new criterion of scan suspension. The scan suspension criterion, described in detail below, ensures that the running values of all the afore-mentioned embodiments provide favorable conditions and only if all of them vote in favor of suspension will the UE resort to suspending the scan of the neighbor cells. However, before invoking the criterion, the UE must meet the pre-conditions of having performed a minimum of one to a maximum of five (as given in protocol specifications) updates of the entire "neighbor cell" list and has decoded the BSIC of the top six neighbor cells. This ensures that the UE has a list of top six neighbor cells ready should an emergency arise.

A preferred embodiment of the invention provides that if the running DSC counter is more than DSC_MIN_DROP; and if the running successive failure count is less than MAX_SUCCESSIVE_FAILURE_COUNT; and if the running fluctuation count is less than MAX_FLUCTUATION_COUNT; and if the time since last update is less than MAX_STALE_NCELL_DATA_TIMER; and finally, if the UE has been doing well in terms of meeting the process goal by satisfying the above checks, an additional check is performed to predict any imminent degradation of service by checking if the running received signal level and SNR is more than floor values, RXLEV_MIN and SNR_MIN, for at least a minimum of MAX_WAIT times. If all these checks are satisfactory, the UE can be considered to have satisfied the scan suspension criterion.

An embodiment of the invention relates to allowing the UE to temporarily suspend the procedure of BSIC re-confirmation of the top six cells every 30 seconds, as known in conventional systems, during the time when the scan suspension is in progress. The UE shall resort to normal BSIC re-confirmation procedure once the afore-mentioned criterion is dissatisfied. This embodiment results in additional power saving by preventing un-necessary BSIC re-confirmations during the battery-save duration.

Yet another embodiment of the invention, makes use of the new measuring yardstick to slow down the frequency of cell re-selections during the time when the afore-mentioned criterion is satisfied and the UE has suspended neighbor cell scanning. This embodiment ensures that the UE refrains from making hasty and frequent cell re-selections in search of the best possible cell all the time. As per the new measuring yardstick, as indicated in a previous embodiment, the UE will always try to maximize its stay in a cell as long as its chief process goal of decoding NW messages is not compromised. Behavior of the UE has been found to be very greedy in nature whereby the UE was always looking for an opportunity to relocate to the best cell, all the time, even if the UE was doing pretty well in the given serving cell.

If the UE is able to successfully decode NW messages and if there are hardly any fluctuations in meeting the goal, then there is little need for the UE to act greedy and hence it attempts to take shelter from the best cell. Thus, even if there is a neighbor cell, which is offering better signal reception level, the UE will hold on to the re-selection as long as the afore-mentioned criterion is satisfied. The manifestation of this embodiment boils down to opening and closing of a reselection window at layer one of the GSM layered architecture. The UE's higher layers can make a reselection decision only when the scan suspension criterion has opened up a reselection window.

Another embodiment of the invention relates to adding a separate data collection module inside the UE whereby the UE will store important air interface parameters viz. signal level, signal quality, success rate in meeting the process goal, fluctuation rate of meeting the process goal over a specified period of time. Analysis of the stored data will enable the UE to determine how the air-interface environment had been in the past averaging duration. But, more importantly, the UE will be able to implement standard interpolation/extrapolation methods, known in the mathematical domain, to predict what the air-interface environment is going to be like in the very near future, i.e., until the next averaging duration. With the knowledge of the same, the UE can adaptively optimize the entire optimization process itself by increasing or decreasing the extent of optimization. This tuning can be achieved by adaptive selection of values for the plurality of thresholds as indicated in all the afore-mentioned embodiments. This feedback controlled mechanism will ensure that the gain of the optimization is continuously monitored and adapted accordingly. The implementation of program logic is left to the skilled implementer but the general trend can be understood from the detailed description section.

In order to accomplish these objects, the invention provides a system for improving an overall battery life of a GSM device in a wireless communication system, powered by GSM standards, which maximizes battery lifetime of mobile terminals thereof according to an optimization mechanism for suspending neighbor-cells scanning, the system having a wireless device including a central processing unit ("CPU") executing software programs intended to comply with GSM protocol specifications; an RF transmission unit and an RF reception unit functioning either independently or as a single unit; a specialized Digital Signal Processor being able to process received signal at a corresponding receiving antenna and offering estimates of the received signal level and quality; a logic algorithm by which the mobile terminal powers off an RF module thereof for a definite period of time and wakes up at pre-determined interval to listen to paging messages transmitted thereto; and firmware/software performing neighbor cell monitoring in compliance with a protocol mandated by GSM standards.

BRIEF DESCRIPTION OF THE DRAWINGS

The above and other objects, features and advantages of the present invention will be apparent from the ensuing detailed description of the invention taken in conjunction with the accompanying drawings, in which.

DETAILED DESCRIPTION OF THE PREFERRED EMBODIMENTS

Figure 1:
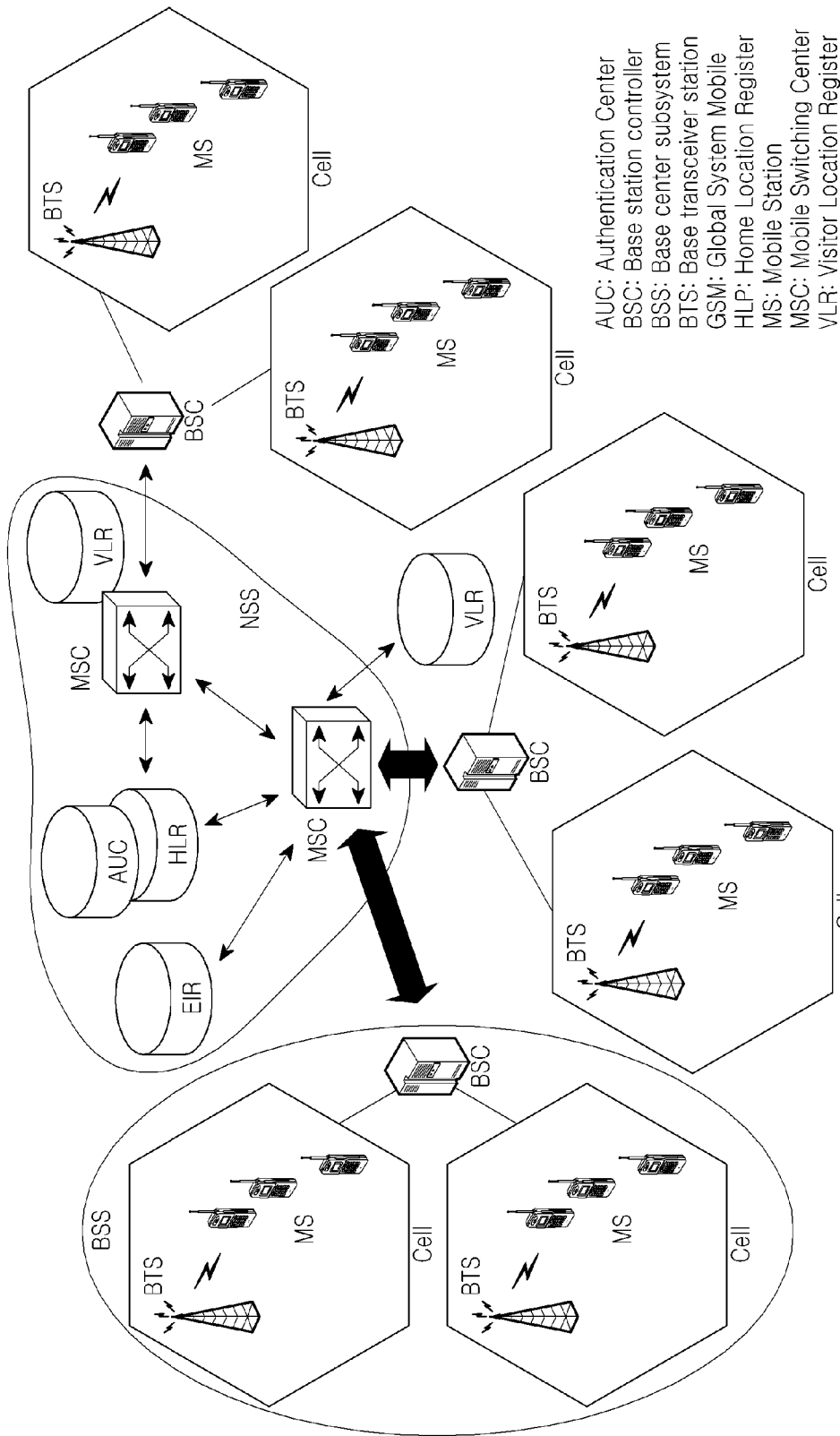
FIG. 1 illustrates the overall architecture of a GSM network with multiple cells and the network infrastructure components.
Figure 2:
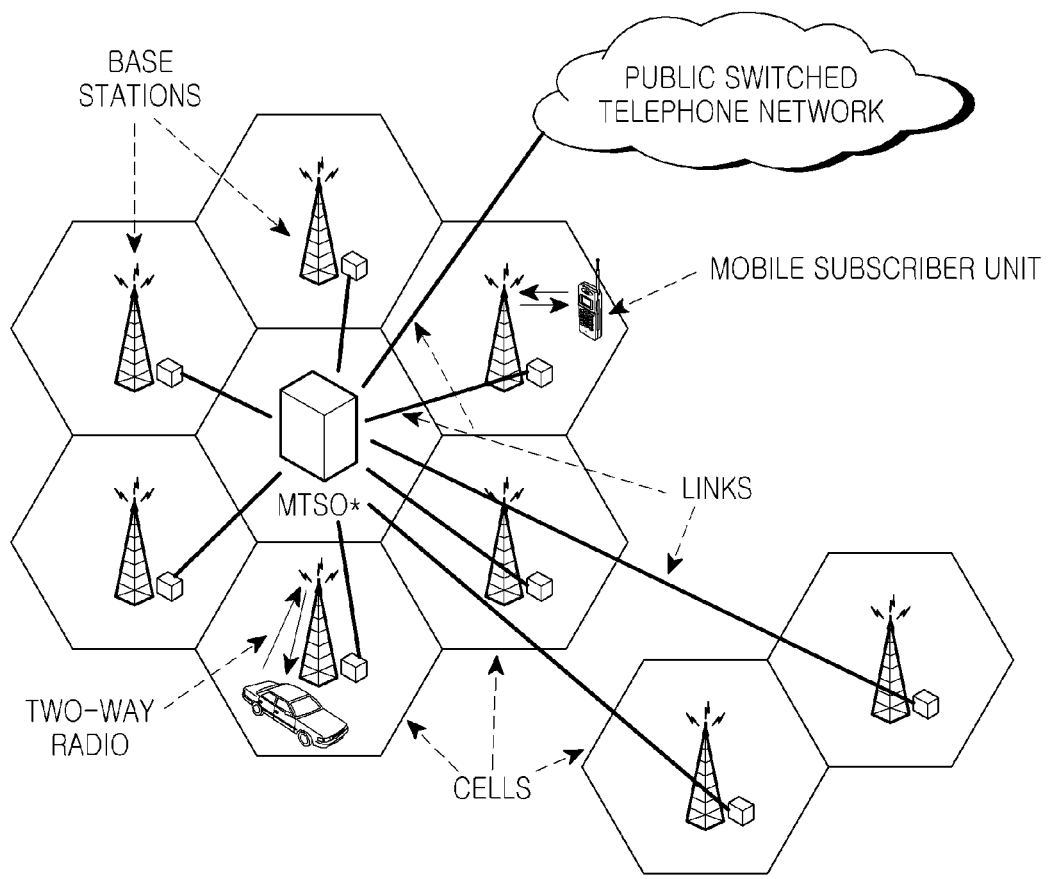
FIG. 2 illustrates the cellular architecture, which encompasses an entire region with plurality of cells.
Figure 3:
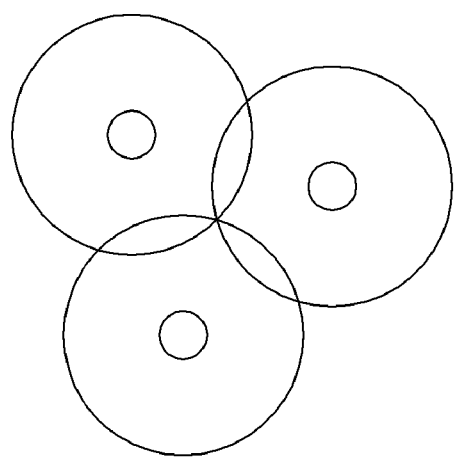
FIG. 3 illustrates ideal cells, in a network, which have an overlap area.
Figure 3:
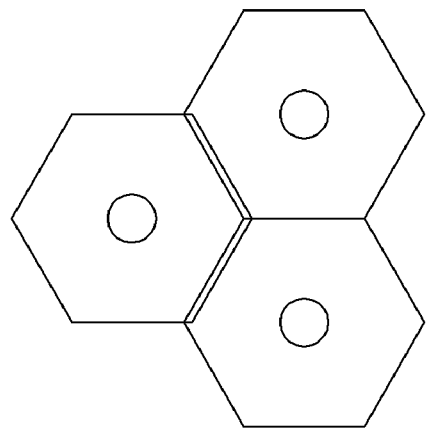
Figure 4:
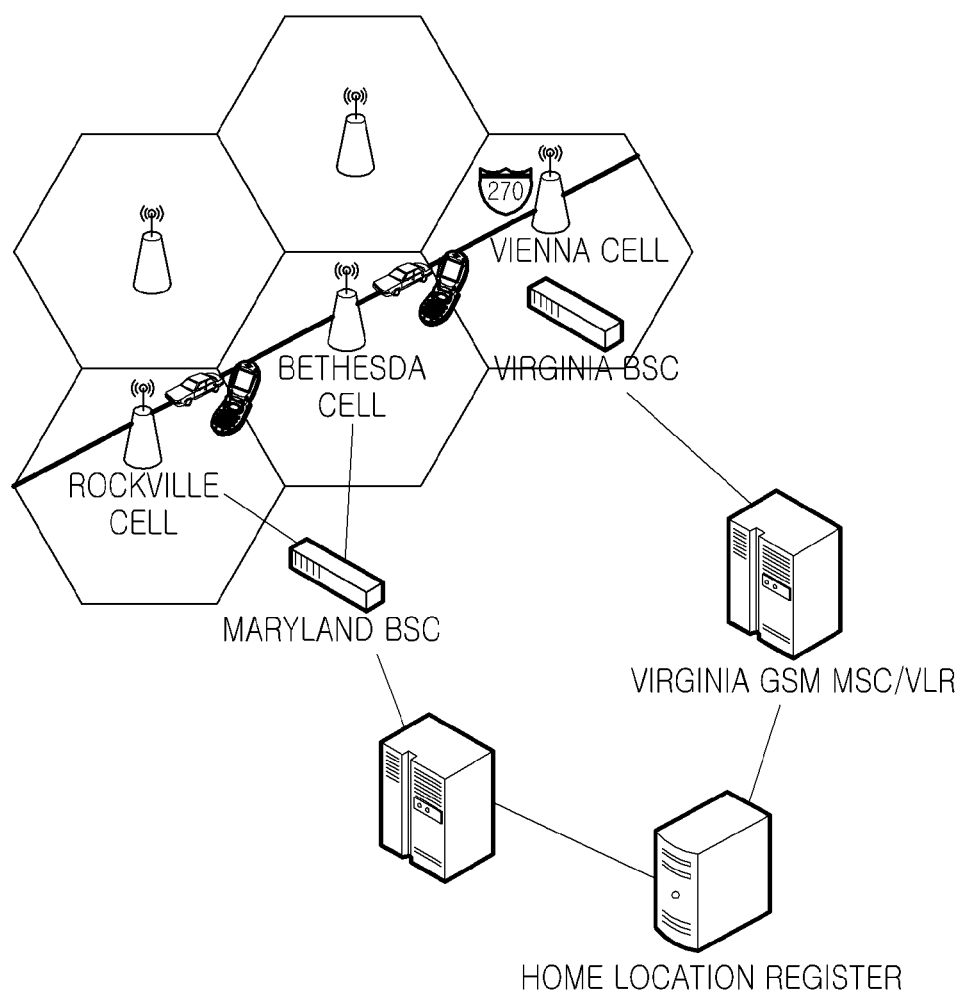
FIG. 4 illustrates the cell reselection process in a typical GSM network with a moving mobile terminal being served by the best cell, at any point of time.
Figure 5:
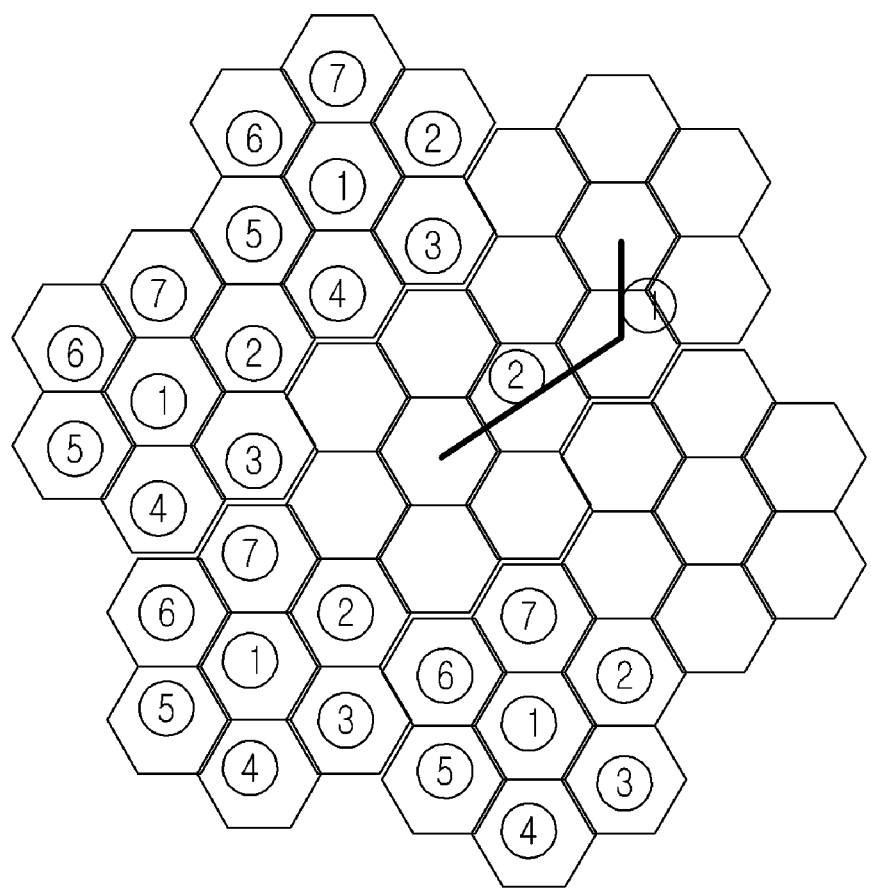
FIG. 5 illustrates a typical GSM network with a cluster size of seven.

Preferred embodiments of the present invention will now be explained with reference to the accompanying drawings. Particularly, in referring to the accompanying drawings, it should be noted that the details shown therein are illustrated only by way of example, and are provided to illustratively disclose preferred embodiments of the present invention and to give the most useful and easily comprehensible description about the principles and conceptual aspects of the present invention. In view of this, constructive details of the invention will not be described beyond the extent necessary for one of ordinary skill in the art of understand the present invention.

The present invention defines a comprehensive scan suspension criterion which is not dependent on the fluctuations of the above described raw signal parameters or speed estimation techniques. Instead, this invented criterion is dependent on a network sent parameter, BS_PA_MFRMS, and thereby defines a new measurement yardstick in the decision-making process.

To facilitate the explanation of the present invention, the terms generally used herein are described below:

GSM: Global System for Mobile Communication.
DSC: Downlink Signalling Counter
SNR: Signal to Noise Ratio over a receiving period.
RXLEV: Received Signal Level over a receiving period
K: Re-use factor employed by the operator during network planning.
D: Re-use distance after which the same set of ARFCNs is re-used.
R: Cell radius.
BCCH: Broadcast Control Channel transmitted by the network operator, also called the beacon carrier of a cell and carries information about the system.
ARFCN: Absolute Radio Frequency Channel Numbering, unique number mapped against a particular RF carrier.
Co-Channel Interference: Interference caused between cells employing the same carrier frequency.
Fading: The process by which the RF signal level gradually degrades as the distance between the measurement point and the actual transmission point increases.
Paging Channel: A channel of information found in the BCCH-carrier which every mobile station needs to read to know if there is an incoming call for it.
Paging Group: Each mobile is a part of a specific paging group and needs to monitor only messages pertaining to that paging group.
BS_PA_MFRMS: Network provided periodic interval at which paging messages repeat for each paging group.
MO: Mobile originated call.
MT: Mobile terminated call.
BTS: Base Transceiver Station.
RF: Radio Frequency
UE: User Equipment, typically the mobile handset, looked at from protocol perspective.
NW: Network/Operator which provides the service.
DRX: Discontinuous Reception
BSIC: Base Station Identity Code a unique code that identifies a cell.
DSP: Digital Signal Processor a specialized processor to perform signal computations
MAX_RETRANS: Maximum attempts the UE makes to send a Call Request message to the NW
MS_TXPWR_MAX_CCH: Maximum power at which the UE is supposed to transmit the RF energy during a call setup request.
RXLEV_ACCESS_MIN: Minimum signal energy level which the UE should receive from the NW.
Standby Time: The average battery life (in hours) of an UE when it is not involved in making or receiving any calls . . . just monitoring the NW for incoming calls.
C1: Cell selection criterion, given by the GSM protocol specifications as follows:

$$C1 = (A - \text{MAX}(B, 0))$$

A: Received Signal Level—RXLEV_ACCESS_MIN, which determines how strong the received signal is compared to the minimum requirement.
B: MS_TXPWR_MAX_CCH—Maximum Power the UE can transmit at, which factor determines the handicap of the UE to transmit at the minimum required power. For most of the cases, B is greater than zero indicating that the UE can transmit at the minimum requirement of the cell. If B is greater than zero, MAX (B, 0) returns zero and the parameter MS_TXPWR_MAX_CCH is ruled out of the C1 evaluation.

C2: Cell re-selection criterion, given by the GSM protocol specifications.

IE: Information Element.

RAT: Radio Access Technology

TX power: Transmitting power of an RF carrier.

SYS_THRESHOLD: The system's rock bottom threshold values, for RXLEV and SNR etc, below which communication isn't possible with the NW.

Uplink TX: The process of an LE trying to contact the NW by doing RF transmission.

Reference will now be made to various technologies that the present invention is currently known to be usable with.

Figure 6:
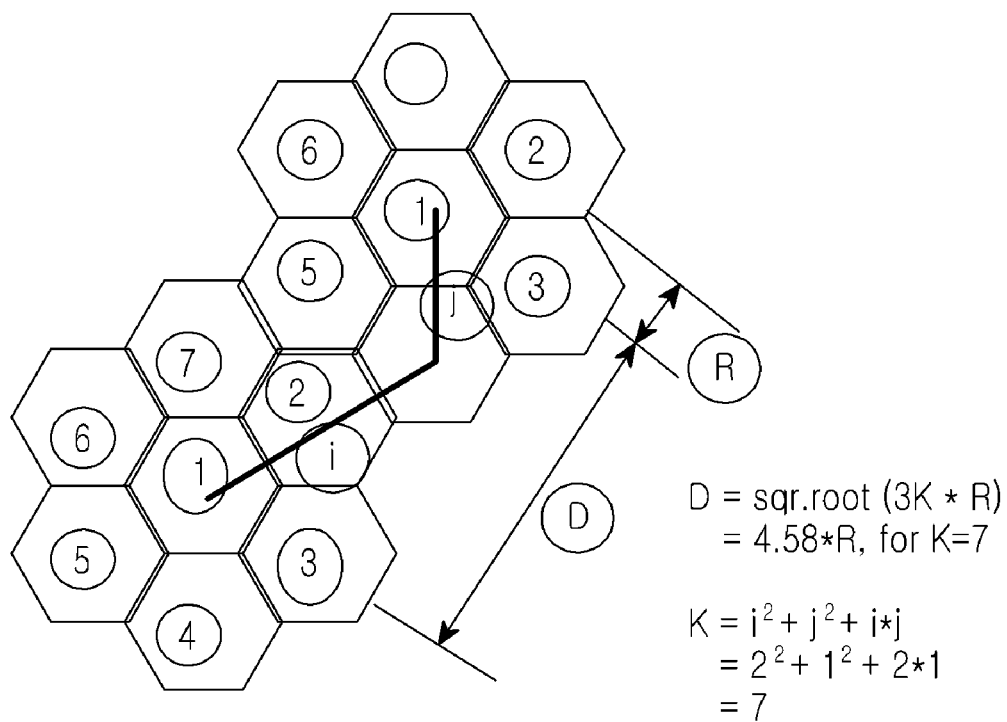
FIG. 6 shows the re-use distance based on the acceptable limit for the cluster size of seven according to the present invention.

If the NW operator desires to maintain a distance of three cells between two re-used frequencies, where i+j=3, as shown in FIG. 6 described above, then the cluster size can be calculated from the equation $K=i^2+j^2+i*j$. This distance of three cells is derived by deciding upon the tolerant limits of interference.

BSIC Verification Every 30 Seconds:

Each cell, as part of its cell identity, broadcasts a unique id called BSIC, the base station identity code. This "identity" is used for uniquely identifying a given cell in the entire network. Out of the plurality of neighbor cells that the UE is continuously monitoring, the UE maintains a list of the six best neighboring cells based on their received signal strength.

In general, it is mandated that UE re-confirm the BSIC of these six best cells at least every 30 seconds to ascertain that it's not a new cell, of same re-used frequency, which has come in. This need for this is substantiated by the discussion in the previous paragraph where the concept of frequency-reuse was illustrated. Therefore, even if the UE is in the same cell for a considerable time, conventional systems mandate that the UE perform identity re-verification. In conventional systems, it can be seen that the UE reconfirms the BSIC of the top three cells almost every 10 seconds and of the remaining three cells almost every 30 seconds. The RF energy used every 10~30 seconds for each of the six frequencies, computed over a period of time contributes significantly to the overall current drain. For example, every 10 minutes, 20 re-confirmations are done per frequency and 120 re-confirmations for all the six cells, at the least!

RF Transmission:

The overall battery life of a UE is not just a function of standby-mode power consumption. Battery consumption in idle mode is indeed a function RF reception. But the more severe factor is RF energy utilized during transmission, when the UE is in the process of making/receiving a call or during a call. The higher the RF transmission power, the greater the battery drains.

Cell Reselection Decision:

Once the UE realizes that it cannot continue in the current serving cells, it makes a decision to alternate to a different cell. The decision for reselection as indicated by C1 and C2 criterion defined above and, as known in the art, is chiefly based on the measure of overall received signal levels from the plurality of neighbor cells, which the UE monitors. Out of the plurality of cells, the one providing higher overall received signal level is the best candidate for reselection, ignoring the fact that the reselected cell might command the UE to transmit at a much higher RF power when it attempts to initiate an active call connection.

The reselection decision, as prevalent in the art, computes C1/C2 values for each of the top six neighbor cells and checks if there is any neighbor cell whose C1/C2 values are greater than that of the serving cell, subject to certain timing constraints. The top six cells that are considered for re-selection have been computed and sorted based only on their "received signal strengths".

Maintaining of a DSC Counter:

For all GSM UE's, periodic monitoring of the Paging Channel is done in the idle mode. This provides the UE with a measure of RXLEV, the received signal level, and SNR, the received signal to noise ratio, of the serving cell. More importantly, the UE maintains a count of success/failure in decoding the received data correctly. This data is the paging data, which the UE uses to determine if there is an incoming call for itself. This counter is called the "Downlink Signaling Counter" or "DSC", as known in the. Which mandates the usage of this parameter, typically its initial value, its increments and decrements.

As per conventional schemes, this counter needs to increase by one every time the UE decodes the paging message successfully; however, never beyond the initial value. Furthermore, this counter would be decreased by four every time the UE fails to decode the paging message. A fall of this counter below zero is an indication that the UE can no longer continue in the current cell and needs to re-select to a better cell immediately. The typical initial value of this counter is given by (90/BS_PA_MFRMS).

This DSC counter value is an indication of how well the GSM UE is able to keep up with the process goal of reading NW messages successfully at every paging interval. This counter will serve to be the "new measurement yardstick" in the current invention, as will be seen in the following discourse. Every time the UE fails to meet the process goal of reading the paging data NW message, this counter decreases by four and increases by one.

The GSM Process Goal:

The actual GSM process goal for a UE camped on any cell, which considers it to be the serving cell, is 1. to be able to read the system information from the cell;
2. to be able to receive paging messages so that the UE can respond to MT calls;
3. to be able to setup a call connection with the network at any point of time.

All other specifications seek to empower the UE to achieve the above three main goals. The concept of "reselection", C1/C2 criteria etc., are all a few of the plurality of means to achieve the above goals. The current invention makes no compromise with the above goals; yet provides a method to remove the redundancies in the existing process by defining techniques that keep the above three goals as the measurement yardsticks. The current invention capitalizes on these process goals to suggest a comprehensive scan suspension criterion which provides much better results in terms of battery saving than the techniques known in the art, which are based on raw signal parameters only.

Limitations:

It has been observed that a large amount of battery power is used in the process of monitoring the neighboring cells and keeping the database of neighboring cells updated. In fact, the process of RF reception to monitor the neighbor cells, in idle mode, is probably the most severe contributing cause for high average current drain. Even though conventional systems are effective to some extent in harnessing the cause of battery drainage, they suffer from many drawbacks as detailed below.

Raw Signal Parametric Decisions:

Conventionally, power consumption is reduced in the idle mode of the UE by monitoring of raw signal parameters and their fluctuations. This need not be correct all the time as the UE can still achieve its goal i.e. the GSM process goal, of decoding paging data, the only thing the UE is supposed to do in idle mode, even if there is significant fluctuation. Fluctuation of raw signal level and raw signal quality, received at the UE's antenna, is inevitable due to a plethora of reasons. Due to uneven terrain and other natural factors affecting RF reception, a UE, even in static conditions as determined by a speed estimator, may cause significant variations in signal level and quality. Thus, it is frequently observed, that different UE's having different RF antenna sensitivities receive the signal differently with non-trivial variation. Conventional schemes do not attempt to absorb the unprecedented spikes/shocks of raw signal parameters and thus can resort to hasty, unwanted decisions.

Above mechanism would yield sub-optimal result as far as battery conservation is concerned, since the objective of UE, in Idle mode, is to decode paging data successfully. Consequently, the decisions to be made on raw parameters might lead to premature re-selection or a premature termination of the battery-saving process.

It is possible that the overall process goal of GSM in receive paging information is not having any fluctuations, even though there is significant fluctuation of signal level and SNR. It is in fact contrary to the objective of UE to decode paging data successfully. That is, the techniques of known in the art are dependent on the inevitably fluctuating raw parameters only and not on a comprehensive criterion, which, the present invention addresses.

Speed Estimation/Speed Sensors/Heavy Signal Processing:

Attempts to reduce power consumption in idle mode of the UE by complex digital signal processing for speed estimation have been employed. In certain systems, speed sensors are employed. Current drain occurs while performing either technique, as the DSP chip requires additional power to complete the requests. Moreover, speed estimation will not yield optimal results, as there are considerable times when the UE is absolutely static or moving with relatively low speed in an uneven terrain when it encounters tremendous interference resulting in failure to meet the process goal of decoding NW paging messages.

The general drawback of the above two conventional techniques is that a decision is being made on raw values, which are received at the antenna of the UE. For a plethora of reasons, these parameters continually fluctuate and their rate of change is non-trivial most of the time. Certain UE's with better RF sensitivity will be able to buffer these variations and still provide successful decoding of NW messages and thereby meet the process goal. The decision making process in conventional systems will have to be customized for each and every UE of different make and model. A UE with very good RF receiver/antenna will be able to withstand signal fluctuations to a greater extent and provide correctly the decoded data to the UE, whereas, under the same given conditions. However a UE with slightly lower RF receiver standards will fail to make any sense of the data. On account of this, instead of making these raw parameters as the yardsticks of measurement, a successful meeting of the process goal is the yardstick.

Greedy UE Behavior:

In conventional systems, UE's always try to take shelter with the best possible cell, all the time. Continuous monitoring is done to check if the UE can re-select to a better cell even if the neighbor cell is only slightly better. This is done even if the UE might not be facing any difficulties in meeting the process goal of decoding NW paging messages at all although it could be facing non-trivial signal fluctuations and SNR fluctuations.

Nonetheless, the UE will attempt re-selection at the earliest possible opportunity. To facilitate the above behavior, the UE resorts to continuous update of the neighbor cell database. Furthermore, the UE resorts to continuous reconfirmation of the BSIC of the top six cells. In a span of 10 minutes, the UE makes close to 120 attempts of reconfirming BSIC. The UE never tries to maximize its stay in a given cell, resulting in frequent reselections thereby wasting battery capacity.

Signal Level Based Neighbor Cell Sorting:

In conventional systems, the UE was measuring the neighbor cells constantly and, after each measurement, was sorting the neighbor cells in the descending order of received signal strength only to determine the top six neighbor cells surrounding the UE. Based on the list of these top six cells, the UE was evaluating the C1/C2 conditions, as known in the art. Given other similar conditions across the neighbor cells, the best cell in the top six cell list was the automatic choice all the time, regardless of the fact that the best cell might command the UE to make RF transmissions at a higher power than the other neighbor cells. The cell-reselection is based chiefly on the received signal strength only. A cell requiring the UE to transmit at a higher power, compared to other cells, is an indication of the cell's lower tolerance to received signal level. A UE in that cell will end up wasting more battery power due to higher levels of RF transmissions.

With due consideration to the flaws in the conventional systems and with a view to exploit a mechanism autonomous to the UE, striking a balanced trade-off between reselection performance and battery drain that would result in highly improved standby time of the UE with absolutely minimal reselection effects, the present invention describes a scheme, or a comprehensive criterion, which achieves the final goal of reduction of battery consumption.

The present invention also focuses on an enhanced wireless communication system to improve the overall battery life of the UE, not just the standby battery life, but with minimal changes in the UE-NW interface. The invention describes a method to achieve the final goal, of reduced neighbor cell monitoring, by making use of a novel decision-making yardstick not seen in the known art. Furthermore, the UE exploits this new measuring yardstick to maximize the stay of an UE in a given cell for a longer time, thereby reducing the frequency of cell-reselections and thereby saving battery power.

This invention strives to rid the UE of its otherwise greedy behavior as long as it can without affecting the UE's process goal.

This invention improves the overall battery life of a GSM UE by optimizing three areas where considerable draining of battery occurs:

1. Idle mode neighbor cell monitoring and frequency of cell-reselections;
2. Idle mode neighbor cell identity re-confirmation at periodic interval; and
3. Idle mode re-selection criteria, with focus on optimizing RF transmission power should the UE attempt to get involved in an active call.

These three techniques are presented in order and they would be triggered at the failure of the preceding technique, thereby providing a three-tier optimization mechanism.

Rationale of the First-level Optimization:

The inventive technique used for the intelligent scanning is based on real-time data received by the UE at any point of time and is intrinsically linked to the "success of the UE in making sense of the received data". Received signal level and quality are just raw measuring yardsticks inevitably fluctuating with time. The important point is for the UE to decipher and make sense of the information and not bias its decision with how strong or stable the signal level or quality was. Furthermore, the technique ensures that UE predicts an imminent degradation of service quality and prepares itself for a change of service area.

For the sake of argument, it can be stated that with varying RF antenna sensitivity, different UEs of different make and manufacturer will behave differently to a given variation of the raw signal parameters. One make of the UE might result in failure to decode the NW message at a given signal level/quality variation while another UE of different make and better RF sensitivity can easily decode the NW message and meet all the GSM process goals. Conventional practices will result in customization of the fluctuation and rate of change thresholds from one UE handset to another for the same manufacturer itself, not to mention the trouble of customization across manufacturers. This fails to provide a generic solution to reduction of power consumption.

Hence the decision-making yardstick prevalent in conventional systems, signal level and signal quality and speed, is replaced in this invention with the new yardstick of success of decoding NW messages or the running DSC counter. Fluctuation of this new yardstick will now be used to decide how the UE is doing in the serving cell. This new measuring yardstick is a high-level criterion to be implemented in the layer ONE of the GSM layered protocol architecture will provide a solution, generic across all UE manufactures and across antenna-sensitivities.

Rationale of the Second-level Optimization:

Once the first level optimization fails and the UE resorts to full-fledged scanning of the neighbor cells, the invention will trigger the second level optimization whereby the UE will, with the aid of the NW, obtain the NW design parameters viz., cluster-size, cell-radius and the power at which the re-used frequencies are being transmitted at in the adjacent cluster.

Prevalent practices the UE to re-confirm the BSIC of the top six neighbor cells at least every 30 seconds. This would result in significant power drain over a period of time. By using the current invention, the UE will be able to find out if there is a need, at all, to re-confirm the BSICs of the top six cells. In most of the cases, this will result in the UE being able to circumvent the incessant re-confirmation and thereby save battery power.

By knowing the cluster size and the cell radius, the UE can find out, using standard algorithms, what the re-use distance (D) is for that given frequency. Typically, one can use the equation $D=SQR.ROOT(3*K*R)$, to ascertain the re-use distance from the cluster size (K) and cell-radius (R). Knowledge of the re-use distance (D) and the power at which the re-used frequency is being transmitted, the UE will, using services of a DSP, be able to ascertain how badly the re-used frequency will be degraded/faded. In real terrain, the actual degradation will be much worse. Using this data, the UE can decide if it is possible to get a received signal level of the re-used frequency such that it finds a place in the top six neighbor cell list.

An alternate embodiment of the invention relates to the NW sending additional parameters to the UE in the serving cell by which the UE can estimate the cell planning and the re-use distance. The additional parameters would be the cluster-size, the cell-radius and the powers at which the re-used frequencies in the adjacent cluster are being transmitted.

Another embodiment of the invention relates to the UE being able to make sense of the additional parameters and work out the re-use distance, with the services provided by the underlying DSP and well-known signal algorithms.

One embodiment of the invention defines a threshold parameter MIN_REUSE_FADING_EXTENT, which represents the minimum degradation or fading, in percentage, of the distant re-used frequency that should appear at the UE's antenna for the UE to skip BSIC re-verification for that neighbor cell, out of the 6 neighbor cells, which corresponds to the same frequency.

Rationale of the Third-level Optimization:

Finally, when UE realizes that it cannot survive in the current cell, it will decide to move over and re-select to one of the top six neighbor cells, the choice of which is subject to C1/C2 criteria. As per standard practices, the UE will always select to that cell, out of the plurality of six neighbor cells, which has the highest received signal level. It is probable that the reselected cell might ask the UE to make RF transmissions at a power level much higher than the other neighbor cells. Eventually, if the UE were to initiate an active connection, it will end up using more battery power. The invention, as would be seen in the following discourse, provides a mechanism to fine tune the reselection decision so that the UE moves to the most optimum cell, based on a weighted combination of "the received signal level" and "the cell's tolerance to RF transmissions from the UE"; not just based on the received signal level.

As well known, the UE accesses the various cell parameters of the neighboring cells. This substantiates the fact that, at any point of time, the UE has idea of the MS_TXPWR_MAX_CCH of all the top 6 neighboring cells. This parameter, which is a cell parameter, indicates the RF TX power at which the UE should transmit while accessing the NW for the first time. Higher value of this parameter indicates the cell's lower tolerance to RF transmissions from the served UEs.

Another embodiment of the invention relates to making use of the MS_TXPWR_MAX_CCH parameter in the decision of cell re-selection instead of plain C1/C2 criterion as typically done. Instead of looking for the best cell in terms of received signal only, the UE can assign specific weights to received signal level and the afore-mentioned parameter, MS_TXPWR_MAX_CCH, to create a sorted list of top six cells where the sorting will not be on the basis of received signal level only, but on a weighted measure of "received signal level" and the afore-mentioned parameters.

Given this weighted decision, if there are two contending cells with one having received signal level slightly better than the other one but having a MS_TXPWR_MXX_CCH much lesser than the other one, it would be a more prudent decision, as per this invention, to reselect to the one which is having significantly lesser MS_TXPWR_MAX_CCH. This is an indication that the second cell is more tolerant to UE's RF transmission and would result in the UE transmitting at a lower power. Known practices use this parameter in the evaluation of C1/C2 criteria, but with an entirely different reason. The known C1/C2 criteria evaluates if this parameter, sent by the NW, complies with the transmission capability of the UE or not. If the value commanded by the NW is below the maximum transmission power capability of the UE, this parameters ceases to be of any importance in the C1/C2 criteria, as can be seen in the definition. The top six cells, which the UE maintains with itself, are sorted only on the basis of received signal level.

Unlike conventional systems, this technique doesn't make the following assumptions:
1. There is less need to monitor the neighbor cells if the UE is stationary since the received signal remains fairly constant.
2. If the UE is moving slowly, there is less need to monitor the neighbor cells.
3. There would be sensors and/or speed estimators in the UE which will, to an acceptable accuracy, provide information about the speed at which the UE is travelling.
4. If the rate of change of signal level and quality is significant, then it is an indication of UE's mobility and hence neighbor cells scanning should not be suspended.

Prior to describing the implementation of the invention, it would be worthwhile to delineate what is meant by "paging group", "beacon frequency" and "system parameter".

A "beacon frequency" of a cell is that frequency which carries system information about the cell. At the air interface, there are many radio frequencies present, some of which are beacon frequencies though most are not. Per cell, there is just one beacon frequency and a plurality of other radio frequencies which are used primarily for traffic data. It is essential for a wireless device to identify the beacon frequencies from the general-traffic radio frequencies.

Figure 7:
FIG. 7 illustrates the time division multiplexing nature of the GSM system according to the present invention.
Figure 7:
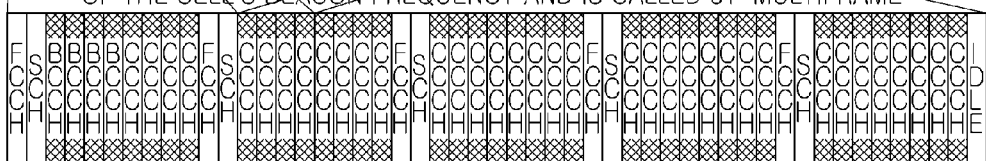
Figure 7:
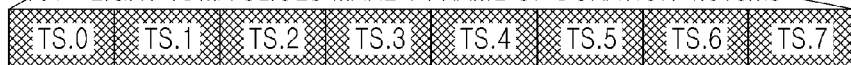

GSM is a time-division multiplexed system where each radio frequency is sliced into eight Time Slots (TS). Slicing into eight time slots essentially means that the eight different unique information elements, intended for eight different users, can be transmitted on just one single frequency. Each unique user just needs to know which slot is intended for it. Item 101 of FIG. 7 illustrates each slot uniquely identifying a physical channel of information. Thus for a single radio frequency, we get eight separate physical channels of information. These 8 slots make up one Frame of information, also known as one TDMA Frame. This TDMA frame is 4.616 milliseconds in duration, after which the second frame starts. Item 101 of FIG. 7 serves to show a GSM TDMA frame. For the sake of brevity, we can say that any one wireless device, assigned the time slot 2, will exchange data with the NW only when its time slot occurs. Every 4.616 milliseconds later, the wireless device will send/receive data to/from the NW.

Each radio frequency in a GSM system is sliced up by eight slots thereby allowing eight users, ideally, to be served on one radio frequency. Each user accesses the NW at an interval of 4.616 milliseconds. The beacon frequency is distinctly different which enables any wireless device to identify it without any foreknowledge. In the beacon frequency, the 0th time slot is reserved for the cell information, which leaves additional 7 time slots for traffic data. In the beacon frequency, 51 TDMA frames are used up, all in the 0th time slot, to convey one Multi-Frame (MF) of information.

Item 102 of FIG. 7 serves to indicate the presence of the 51-multiframe in the beacon frequency. After the 51st TDMA frame, the entire structure repeats, all on the 0th time slot only. In Item 102, four different types of information elements can be seen: FCCH, SCH, BCCH, and CCCH.

The presence of FCCH and SCH information, as indicated in Item 102 of FIG. 7, uniquely identifies the "beacon frequency:" from any other radio frequency. FCCH, the frequency correction channel, comprises of a particular data sequence, 142 zeroes to be precise. When the wireless device scans the air interface, it always tries to look for a data of 142 zeroes on all the radio frequencies. If not found, the wireless device concludes that the radio frequency is not a beacon frequency. Otherwise, the wireless device attempts to read the identity of the cell from which the signal transmitted it. The cell identity information, BSIC to be precise, is present in the SCH information block. SCH, synchronization channel, carries information which uniquely identifies the cell.

All the system information, pertaining to the cell is found in the next block of information, BCCH, as indicated in Item 102 of FIG. 7. This data is spread in 4 TDMA frames, on the 0th time slot only, and is commonly known as the Broadcast Control Channel. By reading this block of data, the wireless device gets to know all the cell parameters, including MS_TXPWR_MAX_CCH and BS_PA_MFRMS, the foundation aspect of this invention. Typically, 4 TDMA frames, on the 0th time slot, comprise one block of information.

The next block is CCCH, Common Control Channel, and is the most germane to this invention discussion, as indicated in 102 of FIG. 7. 4 TDMA frames, occurring on the 0th time slot, comprise one block of information. We can see in Item 102 of FIG. 7 that there are nine such blocks of information. Each block can be considered as a Paging Block and hence numbered 1 through 9 as PCH 1 through PCH 9 where PCH stands for Paging Channel. Every wireless device present under the current cell needs to monitor the PCH on this beacon frequency to listen for any incoming call notification. For each Per 51-multiframe there are 9 PCH blocks. Without the concept of DRX, a wireless device had to monitor all those 9 PCH blocks continuously to listen for an incoming call notification. However, with the introduction of DRX, periodicity and paging groups have been introduced. Every wireless device now belongs to a particular paging group, with other wireless devices also. The NW and wireless devices belonging to a particular paging group mutually understand that any incoming call notification will now be transmitted in only one of the specific nine PCH blocks and not on all of the nine PCH blocks. For the sake of brevity, an assumption is made that, for a wireless device, the PCH block to be the second CCCH block where paging information to it is being sent by the NW. The NW also informs, as part of its cell parameters, the value of BS_PA_MFRMS which indicate how many 51-multiframes would pass before the wireless device's own paging block repeats.

For the sake of brevity, the assumption is made that the BS_PA_MFRMS is five. Item 103 of FIG. 7 shows the scenario where the paging periodicity is five. With the knowledge of this periodicity, the wireless device in that cell will read the PCH block 2 in the 0th multi-frame as it belongs to that specific paging group. The wireless device will then skip all the remaining PCH blocks in the 0th multi-frame. Additionally, the wireless device will skip monitoring of all the 9 PCH blocks in the 1st, 2nd, 3rd and 4th multi-frame, as none of the PCH blocks correspond to its paging group. On the 5th occurrence of the multi-frame, the wireless device will again monitor the second PCH block to read incoming call notifications for its own paging group.

With DRX, the wireless device shuts off its RF reception unit, after reading its own PCH block, for the entire duration until its own paging block repeats. This repetition period is controlled by the NW parameter, BS_PA_MFRMS. The minimum repetition period is two and the maximum possible is nine. At its own paging block, the wireless device typically wakes up and monitors its own paging information. And then it monitors at the least seven neighbor cells and then shuts off the RF reception again. A wireless device is considered camped, a term that we will come across quite frequently in the foregoing discussion, on a particular cell when:

It has identified the beacon frequency of the cell and has all timing information regarding the start and end of a TDMA frame and is also aware of the TDMA frame number.

It has read all the BCCH data blocks and has ascertained all the necessary system information that the cell has to offer. This includes knowledge of all the radio frequencies which are considered neighbor cells. This list can be a maximum of 32. Periodically, the wireless device reads the entire BCCH information and keeps the system information updated.

It has ascertained its own paging group and is listening to its paging group for any incoming call notification at the right intervals.

It monitors the signal level and the signal quality of the serving cell every time it wakes up and reads the paging block.

It monitors the signal level of all the neighbor cells, given to it by the NW, and keeps a list of the six best neighbor cells.

Finally, the wireless device compares the received signal level of the serving cell with the received signal levels of the top six neighbor cells and ascertains if any one of the neighbor cells is better than the serving cell and keeps looking for opportunities to re-select to a better cell.

The typical process of implementing the invention and the rationale behind selection of the various threshold parameters will be evident from the disclosure herein. The generic rationale can be extended to other paging periodicity values also by one skilled in the art. The process of implementation is not an embodiment of invention and is not claimed thereby.

Some legends used in the following description are:

S_xx: Represents a specific (xx) state in the implementation process. Upon reaching a new state, the wireless device will try to perform all the actions associated with it. Once the actions are over, the wireless device will attempt a state transition by evaluating the condition.

C_xx: Represents a specific (xx) condition that may or may not cause a state transition based on the outcome of the conditional check. This conditional check will ensue once the wireless device has completed the actions associated with that state.

A_xx: Represents a specific (xx) action that the wireless device needs to perform in any given state. This action will be performed just once and immediately after moving into the specific state. In the event of a plurality of actions associated with a given state, the actions will be performed in ascending order of the Action ID.

Fall Through: This is a default state transition from one state to another. The state which causes a fall through is a transient state, which performs a set of actions and then automatically shifts over to the new state.

Figure 8:
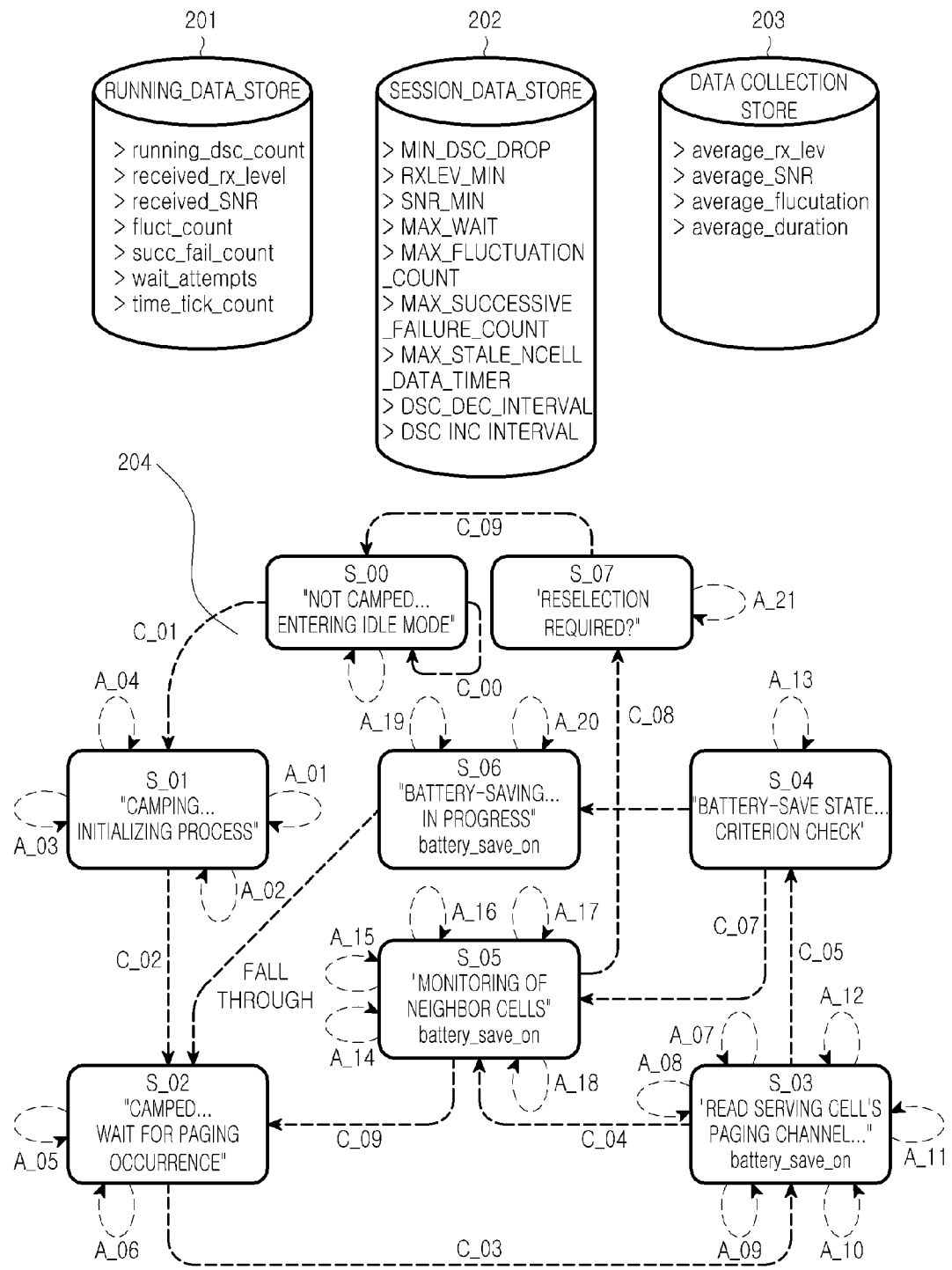
FIG. 8 illustrates modules added and the generic flow of information that will occur in the implementation of the present invention.

FIG. 8 illustrates modules added and the generic flow of information during implementation of the present invention. For conciseness it is assumed that the periodicity interval of NW paging is 2. Otherwise stated, the BS_PA_MFRMS is 2.

Item 201 of FIG. 8 illustrates running data store which shows the various measurement yardsticks required for implementation of the present invention. The running parameters therein will be updated from time to time and will serve to indicate the ability of the wireless device in meeting the process goal. Additionally, each of these running parameters finally aid up in evaluation of the invented scan suspension criterion.

Item 202 of FIG. 8 illustrates a session data store which shows the various measurement thresholds required for implementation of the present invention. These session parameters are chosen based on the desired effectiveness of the battery-saving mechanism and can be re-adjusted at appropriate durations to achieve higher or lower gain from the battery-saving process. The selection of appropriate values for the thresholds depends on the paging periodicity. Each preceding running parameter has a corresponding threshold here in this session data store. Per battery-save session, these parameters remain constant while the running values keep changing frequently.

Item 203 of FIG. 8 illustrates a data collection store which shows the various parameters required for calculating and making judgments on the air interface. Typically, the average signal level, the average SNR and the average fluctuations of the wireless device's attempt to meet the process goal are stored herein. The additional parameter is the averaging duration which represents the time over which the data will be collected before making a judgment. The judgment of this module would represent the air interface environment over the past averaging duration and could be any of the following: "worst", "bad", "very good" and "excellent". This module will additionally interpolate/extrapolate, from the previous data, what the air-interface environment is going to be like in the very near future, typically until the next averaging duration. And accordingly, this module will re-evaluate the values for the parameters present in the session data store thereby lowering or heightening the degree of battery-saving. This continuous feedback-controlled processing will be invoked at the end of averaging duration and the wireless device will continuously modulate the degree of battery-saving gain.

Item 204 of FIG. 8 illustrates the state machine or the control flow in the wireless device to implement the current invention. In the following description, the wireless device is considered "camped" if the requirements 1 through 6, mentioned above are met.

(1) 00 or "Not Camped" State:

(1.1) Description of State, S_00:

In this state, the wireless device is not camped to the NW. In technical terms, the wireless device has not identified the FCCH/SCH of any cell and has not started listening to the Paging Channel, or the paging group, of any given cell. Furthermore, the wireless device has not read the cell's system information parameters from the BCCH data blocks, as can be seen from Item 102 of FIG. 7, and has no knowledge of BS_PA_MFRMS or the paging periodicity interval.

(1.2) Associated Actions, A_00:

The only action present in this state is A_00 which serves to force the wireless device to look for opportunities where it can start the process of camping. This process includes turning on the radio frequency unit, the antenna, and initializing all hardware units and software units so that reading of the FCCH/SCH is performed and then subsequent reading of BCCH is done.

(1.3) Conditional Checks, C_00, C_01:

If the outcome of action A_00 has not been fruitful and the wireless device has not initiated the camping process, the condition C_00 is satisfied and the wireless device loops in the current state S_00.

To the contrary, if the outcome of the action A_00 resulted in initialization of the camping process, the conditional check C_01 is satisfied and the wireless device makes a transition to the state S_01.

(2) S_01 or "Camping . . . " State:

(2.1) Description of State, S_01:

This is a transitory state where the wireless device starts the process of camping. This state can be reached only once per session of the wireless device. In this state, the wireless device starts scanning radio frequencies at the air interface and starts the subsequent search for the beacon frequencies. The process indicated at the start of the section is performed here and finally gets camped. In the camped cell, the wireless device reads the BCCH data and gathers all the cell information. The wireless device gets to know the BS_PA_MFRMS or the paging periodicity. The wireless device also determines its paging group in this state and becomes ready to perform the DRX operation. This being a transitory state, the wireless device quickly moves into the new state after completion of the preferred actions.

In the present invention, the wireless device additionally initializes the battery-saving module elements, typically the running data store, session data store and the data collection store.

(2.2) Associated Actions, A_01, A_02, A_03, A_04:

(2.2.1) A_01: This action serves to initialize all the system information for the given camped cell. The wireless device monitors the BCCH data blocks in the serving cell's "beacon frequency" and thereby obtains the whole set of cell information. Typically, BS_PA_MFRMS is read in this process, the parameter which is the most germane to the invention.

In the present invention, this action modifies certain state variables of the state S_05, the neighbor cell monitoring state, to indicate that the neighbor cell list has not been completely scanned yet. This is done so that the condition C_05 in state S_03 evaluates to FALSE and the wireless device resorts to a full scanning of the neighbor cell list at least once. This is done to handle the scenarios where the wireless device has re-selected into a new cell and has to perform, at the least, one complete round of monitoring of the entire neighbor cell list.

(2.2.2) A_02: This action serves to initialize the parameters present in the running data store or Item 201 of FIG. 8, used for implementing this invention. The initialization of the parameters is generic in nature. The rationale behind the initializing values is explained below.

| | |
|---|---|
| running_dsc_count = | 90/BS_PA_MFRMS |
| received_rx_level = | 0 |
| received_SNR = | 7 |
| fluct_count = | 0 |
| succ_fail_count = | 0 |
| wait_attempts = | 0 |
| time_tick_count = | 0 |

The above description reflects the initial value of the "running_dsc_count" which is initialized as in conventional systems. The decrement and increment intervals of this counter are, however, customized and are claimed as embodiments of invention. Selection of the intervals would be seen in the next Action ID. In this example, running_dsc_count attains the value of (90/2)=45.

There is a mapping of signal level strengths to a unique integer value, as known in GSM systems. In the mapping, zero represents the nadir of −110 dBm signal level whereas 63 represent the zenith of −48 dBm of the signal level, As indicated in t Table 1 below. The above initialization has been done at 0, the absolute minimum. The unit "dBm" is a measure of the signal strength in units of millidecibels. Any other choice of unit is applicable and is not restricted to the integer values.

Similarly, there is a direct mapping of signal to noise ratio into unique integers as known in conventional systems as can be seen in Table 2 below a higher Signal-To-Noise-Ratio lows the probability of bit errors in the received signals a lower SNR will result in higher bit errors in the received data and will increase the Bit Error Probability (BEP). The above initialization has been done at seven, the absolute minimum of received signal quality or SNR. The representation present here indicates a reverse growth with 0 being the best quality or the highest SNR and 7 being the lowest quality or the lowest SNR. For the sake of representation simplicity, these reverse values of 0 to 7 are used.

The comparison of received_SNR and SNR_MIN will now be reversed in this current example process. Any other suitable choice of unit is applicable and is not restricted to this reverse order integer representation.

TABLE 1

| Integer | Signal Level Range |
|---|---|
| RXLEV 0 = | less than −110 dBm. |
| RXLEV 1 = | −110 dBm to −109 dBm. |
| RXLEV 2 = | −109 dBm to −108 dBm |
| . | . |
| . | . |
| . | . |
| RXLEV 62 = | −49 dBm to −48 dBm |
| RXLEV 63 = | greater than −48 dBm. |

TABLE 2

| Integer | Range of Bit Error Rate | Typical values |
|---|---|---|
| RXQUAL 0 | BER < 0.2% | Assumed value = 0.14% |
| RXQUAL 1 | 0.2% < BER < 0.4% | Assumed value = 0.28% |
| RXQUAL 2 | 0.4% < BER < 0.8% | Assumed value = 0.57% |
| RXQUAL 3 | 0.8% < BER < 1.6% | Assumed value = 1.13% |
| RXQUAL 4 | 1.6% < BER < 3.2% | Assumed value = 2.26% |
| RXQUAL 5 | 3.2% < BER < 6.4% | Assumed value = 4.53% |
| RXQUAL 6 | 6.4% < BER < 12.8% | Assumed value = 9.05% |
| RXQUAL 7 | 12.8% < BER | Assumed value = 18.10% |

(2.2.3) A_03: This action serves to initialize the parameters present in the session data store or Item 202 of FIG. 8. This section represents the thresholds and hence is the most important decision of all. The gain or effectiveness of the battery-saving process depends on values of these parameters. For the sake of brevity, we have assumed the BS_PA_MFRMS to be 2. From existing systems, we know that running_dsc_count will be initialized to 45, as seen above. Also, from existing systems, we know that, at every failure to decode the paging data, this running_dsc_count will be decremented by 4 and, at every successful decoding, it will be incremented by 1, however never beyond its initial value of 45. A paging periodicity of "2" indicates that the wireless device's paging group will occur very fast, i.e. once in 2 multi-frames. This can be understood from Item 103 of FIG. 7 where a periodicity is "5" has been illustrated.

When the running_dsc_count attains a value of zero, it is an indication that the wireless device has failed to meet the GSM process goal beyond the desired limits. The wireless device would then perform a conventional re-selection. To perform a re-selection, we need to ensure that the wireless device has a neighbor cell database, as updated as possible. We also know, from conventional systems, that the wireless device, at each attempt, usually monitors from six to eight neighbor cells, typically seven. Given this knowledge, we can deduce the following, for this example implementation:

From 45 to 0, it will take almost 11 (45−11*4) successive decoding failures for the running_dsc_count to trigger a cell re-selection.

We need to ensure that the wireless device predicts the impending reselection requirement and keeps the neighbor cells database updated well before the count reaches 0.

The maximum neighbor cell list can be 32 and if seven neighbor cells are monitored at each attempt, we need at least five scanning attempts. Most of the time, we do not need to monitor all the 32 cells and most of the time, the total length of the neighbor cell list is less than 32. Accordingly, we can tailor the number of scanning attempts that we require.

For now, we assume that we have 32 neighbor cells, sorted by the value of received signal level. We will ensure, in this implementation that the wireless device has at least updated 14 neighbor cells, with their new received signal value, before any re-selection is required. To monitor 14 cells, the wireless device would require at least two scanning attempts. Since the neighbor cell list has been sorted in descending order of signal strength, we can safely assume that the first 14 cells that the wireless device will scan would contain the appropriate cells for re-selection and there won't be much adverse effect by leaving the remaining tail-ending 18 cells. The rationale behind this judgment would now be explained. The air-interface surrounding the wireless device experience changes gradually and signal levels of the neighboring cells increase/decrease in a gradual manner. The 3rd top cell cannot suddenly become the 31st top cell in a sudden instant and vice-versa. Such drastic falls or rises don't happen in real environment. Instead, the top 3rd cell will gradually deteriorate and shift to the tail ending positions. This implementation will capitalize on this principle and will be contented with scanning just the top 40% of cell, instead of the full 100% of neighbor cell list. With a very high degree of accuracy and practical results, it can be justified that the top 40% of the neighbor cell list will actually provide the right reselection cell. And the choice of that right re-selection cell will not have altered even if we scanned the entire neighbor cell list.

Based on the above deductions we can now decide the values. The above reasoning just helps to illustrate the rationale behind choosing the values. Any other implementer, skilled at the related art, could decide otherwise and select different values, suited to his desire. Instead of the 40%, any other implementer can reduce it to 20% or increase it to 100%, without affecting the essence of this invention.

| | |
|---|---|
| MIN_DSC_DROP = | 20 |
| RXLEV_MIN = | 16 |
| SNR_MIN = | 4 |
| MAX_WAIT = | 4 |
| MAX_FLUCTUATION_COUNT = | 4 |
| MAX_SUCCESSIVE_FAILURE_COUNT = | 6 |
| MAX_STALE_NCELL_DATA_TIMER = | 240 seconds |
| DSC_DEC_INTERVAL = | 4 |
| DSC_INC_INTERVAL = | 1 |

In the above threshold selection, we have selected values which would result in maximum gain from the battery-saving process. Since the frequency of page group occurrence is the fastest, once in two multi-frames, we have enough time, more than eleven successive decoding failures, before we realize that we need to re-select. This paging periodicity allows the wireless device eleven attempts of failure to meet the process goal before taking necessary actions. Out of the eleven, we have selected six successive failures attempts as the threshold for maximum successive failure count. A straight six successive failure will bring the running_dsc_count from 45 to 21. At this point, the wireless device will start full-blown scanning of neighbor cells. From twenty-one to zero, it will take another five decoding failures or five attempts to read the serving cell's paging channel. Since we have already started the neighbor cell scanning, we can actually monitor 7*5=35 neighbor cells before the running_dsc_count reaches zero. In this case, we are able to scan the whole neighbor cell list.

Since six straight failures bring down the running_dsc_count from 45 to 21, we set 20 as the MIN_DSC_DROP value. Due to the initial value of 45 as running_dsc_count, we can afford to have a DSC_DEC_INTERVAL and DSC_INC_INTERVAL as the default ones of 1 and 4 respectively. Had the initial value of running_dsc_count been 18, owing to 5 paging periodicity, we would have had to use a DSC_DEC_INTERVAL and DSC_INC_INTERVAL as 3 and 2, respectively, so that the running_dsc_count, doesn't prematurely reach zero. It needs to be mentioned again, that this customized interval is applicable only during the time when the battery-save mechanism is on-going. The values of RXLEV_MIN, SNR_MIN, MAX_FLUCTUATION_COUNT, and MAX_STALE_NCELL_DATA_TIMER are chosen a bit extreme to achieve higher levels of battery-saving. However, the choices of these values are not dependent on the paging periodicity and they would be modified based on the feedback from the data collection store. If the air-interface environment is doing well, these thresholds can be tuned in favor of greater battery-saving. If not, these thresholds will be downgraded to achieve lower gain so that the wireless device does not suffer from performance issues. In this case, since the paging periodicity is very fast, we have a lot of time in hand before we need to move out of the serving cell. Hence, slightly extreme values have been chosen to start with, for BS_PA_MFRMS as two.

(2.2.4) A_04: This action serves to initialize the data collection store parameters before the averaging process can ensue. The most important parameters which require decision here is the averaging_duration. The data collection store will pronounce judgment about the air-interface environment as "worst", "bad", "good", "very good" and "excellent" at the end of each averaging period. Based on the judgment pronounced, the wireless device will decide whether to increase the gain of the optimization or to lower the gain. The choice of this duration is left to the implementer. For this implementation, we can choose a heuristic value of 15 seconds. As a second degree of feedback, it can be suggested that the averaging duration be also made a function of the air interface. For air interfaces of "Excellent" and "Very Good", a lower averaging duration is better to catch sudden corner-case changes in the air interface, and a higher averaging duration for the other air interfaces.

average_rx_lev=0 average_SNR=0 average_flucutation=0 averaging_duration=15 seconds.

At the end of every 15 seconds, the wireless device will analyze the data collected over the previous 15 seconds and determine how the air-interface environment had been. Based on standard interpolation/extrapolation methods, known in the mathematical domain, the wireless device will predict what the air-interface is going to be like for the next 15 seconds and accordingly modify the thresholds.

(2.3) Conditional Checks, C_02:

Completion of all the actions A_01 through A_04 makes the condition C_02 true indicating that all initialization has been done. Following this the wireless device changes its state and goes to S_02. At the new state, it awaits for new actions and a subsequent shift into the next state.

(3) S_02 or "Camped . . . Waiting for Page Occurrence" State:

(3.1) Description of State, S_02:

This represents the most stable state of the wireless device and which the wireless device returns to time and again after performing all activities. This is the state where the wireless device shuts off all its peripherals, including the RF antenna unit, and waits for the next occurrence of its paging group. In this state, the wireless device saves the maximum amount of battery power as it shuts down many units, including the DSP and the CPU, at times. It should be the aim of any battery-saving invention to return back to this state as soon as possible and stay here as long as it can.

Figure 9:
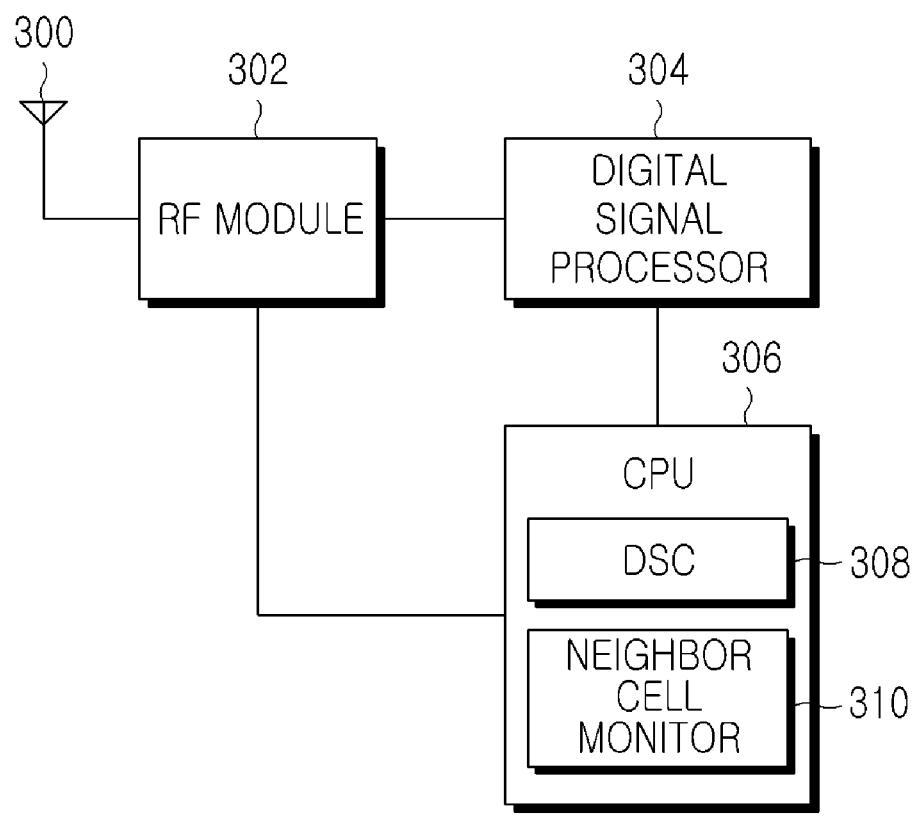
FIG. 9 illustrates the central processing unit, digital signal processor and radio frequency module of an embodiment of the present invention.

As shown in FIG. 9, CPU 306, which includes DSC 308 and neighbor cell monitor 310, interconnects with digital signal processor 304 and RF module 302, which connects with antenna 300.

(3.2) Associated Actions, A_05, A_06:

(3.2.1) A_05: This action serves to calculate the time that the wireless device has at its disposal before the next paging group occurs. Basically, this action ID checks the current time of the wireless device and then ascertains how many TDMA frames later the next page group, corresponding for this wireless device, will occur. For a wireless device which has just read its own paging channel, the next paging channel intended for it will occur after 51*5=255 frames later or 1177 milliseconds later, if we assume the paging periodicity is five. The same can be seen in Item 103 of FIG. 7. For a wireless device, camped on a cell which has a periodicity as two, this occurrence will be much faster, almost every 51*2*4.616 ms=470 milliseconds. This action is an implementation of the DRX operation, as known in conventional systems.

(3.2.2) A_06: This action serves to reduce the consumption of battery power by shutting down several peripherals. This action checks the output of A_05 and determines how much of time, or how many TDMA frames, the wireless device has before it becomes active again. Accordingly, this action shuts down the RF antenna unit for that duration; also, this unit takes care of shutting down the DSP chip among other things. By doing this, this particular state achieves considerable battery power savings.

(3.3) Conditional Checks, C_03:

After completing the associated actions, this check is made. The condition becomes true when the wireless device realizes that a serving cell paging block occurrence is due. The wireless device remains in this state, S_02, as long as it has nothing to do. A_05 provides the duration of non-activity and when the duration is about to get over. The condition C_03 becomes true typically 1 to 2 TDMA frames before the actual occurrence of the serving cell's paging TDMA frame. The wireless device, thereafter, makes a transition to S_03 where it reads the NW paging message.

(4) S_03 or "Read Serving Cell's Paging Channel . . . " State:

(4.1) Description of State, S_03:

This represents the most important state for this invention. This state reads the paging information for the serving cell and provides the new yardstick of measurement upon which this invention criterion is based off. Apart from indicating whether the wireless device was successful in meeting the process goal of decoding the NW paging message, this state also provides a measure of the serving cell's signal strength and signal quality. The running parameters of the running data store, Item 201 of FIG. 8, are updated in this state whenever an indication of the serving cell's received signal level and quality is obtained along with the measure of the wireless device's compliance towards meeting the process goal of decoding NW paging message. Additionally, this state updates the data collection store, Item 203 of FIG. 8, to provide air-interface environment history. It also checks if the wireless device has met the pre-requisites of initiating the battery-saving process. This state houses a data variable, battery_save_on, which indicates if the battery-save mechanism is on going or not. This state-shared variable is updated from the state S_06 which sets this data variable to "ON" when the scan suspension criterion in satisfied. Other times, this retains an OFF status.

(4.2) Associated Actions, A_07, A_08, A_09, A_010, A_11, A_12:

(4.2.1) A_07: This action serves to make the wireless device read the paging data block from serving cell's paging channel. The outcome of this action is either a SUCCESS or a FAILURE in decoding the NW paging message. The rest of the actions take care of updating the running parameters and the data collection parameters. The outcome of SUCCESS or FAILURE indicates whether the wireless device was successful in meeting the process goal.

(4.2.2) A_08: During the process of reading the NW paging message from the serving cell's beacon frequency, the wireless device, using the standard services of the underlying hardware unit, typically the RF unit and the DSP, will be able to get a measure of the received signal level, in the range of 0 to 63, as seen in Table 1, and received signal quality, in the range of 0 to 7, as seen in Table 2. The wireless device, as part of this action, will update the running parameters, received_rx_level and received_SNR, of running data store, Item 201 of FIG. 8, with the received signal level and received signal quality of the serving cell. Additionally, the wireless device, will update the data collection store, Item 203 of FIG. 8, with the currently received values to aid the averaging process of the parameters average_rx_lev and average_SNR.

(4.2.3) A_09: This action serves to update the running data store parameter, succ_fail_count, based on whether the wireless device was able to read the paging message successfully, which is the outcome of A_07. As we are tracking the successive failure count, any successful decoding should reset this running counter to zero. This counter tracks the number of successive times the wireless device failed to meet its process goal. Therefore:

succ_fail_count = 0 if outcome of A_07 was SUCCESS.
succ_fail_count = succ_fail_count + 1 if outcome of A_07 was FAILURE.

(4.2.4) A_10: This action serves to update the running data store parameter, fluct_count, based on whether the wireless device was able to read the current and the previous paging message successfully, which is the outcome of current and the previous A_07. This counter tracks the fluctuation of the wireless device's failure to meet the process goal. A fluctuation cycle is counted as 2 when a SUCCESS-FAILURE-SUCCESS-FAILURE cycle or a FAILURE-SUCCESS-FAILURE-SUCCESS cycle occurs. Basically, any toggling of the success and failure cases will increment this counter. Additionally, two successively similar behaviours will reset this counter to 0 as toggling/fluctuation has stopped.

If outcome of current A_07 is SUCCESS and
{
If outcome of previous A_07 was FAILURE,

```
         fluct_count = fluct_count + 1
      Else if outcome of previous A_07 was SUCCESS,
         fluct_count = 0
      }
      Else if outcome of current A_07 is FAILURE
      {
      If outcome of previous A_07 was SUCCESS,
         fluct_count = fluct_count + 1
      Else if outcome of previous A_07 was FAILURE
         fluct_count = 0
      }
```

(4.2.5) A_11: This action serves to update the running data store parameter, running_dsc_count, based on the outcome of action A_07. Additionally, this action evaluates if the battery-save optimization process is already activated and running. This information is gathered by analyzing the state variable battery_save_on, which is updated to "ON" from the S_06 state. If the battery-saving process is not on-going, the running_dsc_count is incremented by a default value of 1 if the outcome of A_07 was a SUCCESS; however, never beyond the maximum value of 90/BS_PA_MFRMS. Otherwise, the running_dsc_count is decremented by four if the outcome of A_07 was a FAILURE. If the battery-saving process is on-going, the decrement and increment intervals are replaced by the custom-defined values, which is an embodiment of the invention.

```
If (battery_save_on is "ON")
{
   If outcome of current A_07 is SUCCESS
running_dsc_count = running_dsc_count + DSC_INC_INTERVAL
   Else if outcome of current A_07 is FAILURE
      running_dsc_count = running_dsc_count −
      DSC_DEC_INTERVAL
}
Else if (battery_save_on is "OFF")
{
   If outcome of current A_07 is SUCCESS
running_dsc_count = running_dsc_count + 1
   Else if outcome of current A_07 is FAILURE
running_dsc_count = running_dsc_count − 4
}
If (running_dsc_count > 90/BS_PA_MFRMS)
      running_dsc_count = 90/BS_PA_MFRMS
```

(4.2.6) A_12: This action serves to update the running data store parameter, wait_attempts, based on the information gathered by A_08 about the received signal level and quality of the serving cell. If any one of the running parameters received_rx_level and received_SNR, updated by action A_08, indicate values lower than the respective floor value present in the session data store, RXLEV_MIN and SNR_MIN, the running parameter wait_attempts will be incremented. If both the running values are higher than the respective thresholds, the wait_attempts will be reset to zero immediately. This embodiment attempts to predict the air interface and allows the optimization to continue as long as the running values are above the floor values of the optimization.

If received_rx_level is less than RXLEV_MIN, computed from 0 to 63 as in Table 1, OR received_SNR, computed from 0 to 7 as in Table 2 is greater than SNR_MIN, computed from 0 to 7 as in Table 2, then:

```
{
   wait_attempts = wait_attempts + 1
}
Else
{
   wait_attempts = 0
}
```

(4.3) Conditional Checks, C_04, C_05:

Upon completion of all the pre-defined actions, the wireless device will evaluate the validity of the conditions C_04 and C_05 and make a state transition accordingly. C_05 evaluates to TRUE if the following conditions are met. First, the wireless device has completed scanning of all the neighbor cells present in the neighbor cell list at least 1 time up to a maximum of 5, as in conventional systems, times. AND, After scanning the entire set of neighbor cells, the wireless device decoded the BSIC of the top six sorted neighboring cells.

Both the above clauses must be favorable for the condition C_05 to be true. The clauses A and B can be evaluated by checking certain state variables of the state S_05, the state which is responsible for scanning of neighbor cells and decoding of their BSIC. The state variables of S_05 will be set to TRUE when the above two clauses are met. The state S_05 can, at any point of time, set those certain state variables to FALSE resulting in failure of the clauses A and/or B.

C_04 is a complement of C_05 and attains the value of TRUE if C_05 evaluates FALSE and vice-versa. Basically, C_04 evaluates to TRUE if any of the above 2 clauses turn out FALSE.

If C_05 is TRUE, we have met the prerequisite of the battery-save mechanism. We will make a transition to state S_04 where the scan suspension criterion will be evaluated and the wireless device will check if it can avoid going to the power consuming state S_05. Let us, for the sake of illustration, assume that we have transitioned to state S_04.

If C_04 is TRUE, we have not met the pre-requisite of the battery-save mechanism. We will make a transition to state S_05 where the wireless device start the monitoring of the next batch of neighbor cells and update the neighbor cell database with new measured values. Additionally, the wireless device will attempt to decode the BSIC of the top six cells, if they have not been decoded yet, or schedule BSIC re-verification, if it has been decoded already.

(5) S_04 or "Battery-Save State . . . Criterion Check" State:

(5.1) Description of State, $S_{13}$ 04:

This is the state where the actual crux of the invention lies. This state makes use of the running data store parameters and session data store parameters to evaluate if the invented scan suspension criterion is satisfied. Reaching this state is an indication that the basic pre-requisite of the battery-save mechanism has been met, i.e., the wireless device has scanned all the cells in the neighbor cell list at least 1 times and has decoded the BSIC of the top six cells. However, it is not guaranteed yet that the criterion will be satisfied. It is just that the basic pre-requisite of the algorithm has been met. From this state, based on the outcome of the scan suspension criterion, the wireless device will make a transition to power-save state S_06 or to power-consuming state S_05.

(5.2) Associated Actions, A_13:

(5.2.1) The only action, A_13, in this state is to evaluate the scan suspension criterion and decide whether it allows the wireless device to go into power-save mode or not. The outcome of this evaluation is an indication of the wireless device's service conditions in the serving cell. If the outcome of the evaluation is favorable towards power-saving, it is an indication that the wireless device is doing well in the serving cell and the new measurement yardstick of meeting the GSM process goal is not grossly compromised at all. Interpreted otherwise, this means that the wireless device can maximize its stay in the serving cell and need not make hasty re-selections as the current cell is serving it well, if not in the best way.

The scan suspension criterion of the present invention pays attention to a plurality of other high-lever factors, rather than to the raw signal parameters. The plurality of other high-lever factors are all intrinsically linked to the new measurement yardstick of the wireless device's conformance with the process goals. The description of the criterion provided below is to be read in conjunction with the other preferred embodiments summarized in the document and respective claims. This wireless device will initiate a suspension of the neighboring cells if, and only if the scan suspension criterion is satisfied. Once satisfied, the wireless device will periodically check if the scan suspension criterion is still holding good and, if so, will continue with the suspension process and, if not, will discontinue the suspension process and revert back to the traditional specifications-driven behaviour. The criterion makes use of the constituent elements, described in the running data store, Item 201 of FIG. 8, and performs a check against the respective thresholds present in the session data store, Item 202 of FIG. 8, and pronounces the judgment. The criterion will be considered TRUE/SATISFIED, if the all the following checks return a TRUE status:

---
running_dsc_count > MIN_DSC_DROP
and
fluct_count < MAX_FLUCTUATION_COUNT
and
time_tick_count < MAX_STALE_NCELL_DATA_TIMER
and
succ_fail_count < MAX_SUCCESSIVE_FAILURE_COUNT
---

If all the above have indicated a TRUE status in the checks, a further check is made against the optimization floor values:

---
received_rx_level > RXLEV_MIN, for at least a MAX_WAIT times
and
received_SNR > SNR_MIN, for at least a MAX_WAIT times.
---

The criterion, as would be apparent to anyone skilled in the art, does not make any decisions based on the fluctuations/variations of the raw signal parameters, but instead on the comprehensive conditional checks of a plurality of factors, all of which are linked to the new measurement yardstick of the wireless device's conformance to the process goal of decoding paging message.

All the above running parameters are updated at specific intervals by various Action IDs, which would be apparent from the current discussion. The same argument holds good for the threshold parameters also. Furthermore, the feedback-controlled process of this invention will monitor the air interface for a specific duration and adaptively modulate the values of the threshold parameters, thereby changing the effectiveness of the criterion and the gain associated therein. Action ID, A_20, invoked from the state S_06, performs the same activity.

(5.3) Conditional Checks, C_06, C_07:

If the scan suspension criterion returns a favorable indication, TRUE, towards the power-save mode, the condition C_06 stands satisfied. Otherwise, the condition C_07 stands satisfied.

The wireless device will make a transition to the power consuming state S_05 if the scan suspension criterion evaluates to FALSE. Otherwise, the wireless device will transition to the power-saving transitory state S_06 which will take the wireless device automatically to the most stable state S_02.

Let us, for the sake of illustration, assume that the criterion was dissatisfied and the wireless device transitioned to state S_05.

(6.0) S_05 or "Monitoring of Neighboring Cells . . . " State:

(6.1) Description of State, S_05:

This is the state where maximum power consumption occurs as the wireless device braces itself for a series of monitoring of the neighbor cells. Typically seven neighboring cells, out of a maximum of 32 neighboring cells, are monitored every time control reaches this state. When the whole neighbor cell list wraps around, this state sorts the result on the basis of received signal strength. Thereby, it is able to keep a subset of the top six neighboring cells. The wireless device then attempts to read the BSIC of the top six cells. This process is indicated in the beginning of this section as the process of reading FCCH/SCH, as seen in Item 101 of FIG. 7. The wireless device always attempts to keep the BSIC information ready for the top six cells, should there be any urgent need to re-select. This state also schedules the re-verification procedure of BSIC for the top six cells, at periodic intervals. Finally, upon receiving the neighbor cell measurement, this state looks for opportunities of making a re-selection. This state houses a state variable battery_save_on which indicates if the battery-save mechanism is on-going. If this variable indicates "ON" and we reach this state, it is an indication that the scan suspension criterion check in state S_04 was just now dissatisfied and we resorted to normal behaviour.

(6.2) Associated Actions, A_14, A_15, A_16, A_17:

(6.2.1) A_14: This action serves to monitor a group of neighbor cells, typically seven at each attempt. The neighbor cells monitoring is the process of instructing the RF antenna unit to tune into those neighbor cell frequencies and read the amount of received signal level measured at the wireless device's antenna. This action is the primary cause of battery drain in idle mode of the wireless device.

(6.2.2) A_15: This action serves to extract the received signal values for the set of neighboring cells monitored by the action A_14 and sort the neighbor cells in the descending order of signal strength. This primary goal of this action is to keep a sorted list all the time so that at every measurement attempt, the wireless device knows which the top 6 neighboring cells are.

(6.2.3) A_16: This action serves to check, at every measurement attempt, whether the top six cells, obtained from the outcome of A_15, have got their BSIC decoded or not. If the BSIC has not been decoded, this action schedules the BSIC decoding process at the earliest possible opportunity. Additionally, this action keeps note of the time that has elapsed since the last time the BSIC was decoded for all the top six cells.

The second level optimization technique, which has been a claim of this invention, comes into effect in this action. At any point of time, when the elapsed time since the last BSIC verification exceeds the specified limit, as known to be 30 seconds, for a particular top six cells, the wireless device will evaluate the invention claim to check if there is a need to perform the BSIC re-verification or can it avoid the process and thereby save battery. The process is outlined below:

```
For all neighbor cells from top 0th to top 6th, evaluate sequentially
{
    If the neighbor cell's time since last BSIC verification has exceeded
{
    For the given neighbor cell frequency, if the signal degradation extent
of the re-used frequency, being used in the adjacent cluster, is more than
the invented parameter MIN_REUSE_FADING_EXTENT
    {
    There is no need to perform a BSIC re-verification for this neighbor
cell frequency as the re-used frequency is too degraded/faded to
become a member of the top 6 list.
    }
    Else
    {
    The fading/degradation is not more than the minimum threshold and
it is possible that the re-used frequency can come into the top 6 neighbor
cell list. So perform BSIC re-verification for this neighbor cell.
    }
}
Else
{
    Do nothing as time since last BSIC update has not exceeded the
specified limit of 30 seconds
    }
}
```

The only dependency of this action is on the NW to send the additional system information elements to the wireless device. As a suggestion for the implementation of the same, the NW can send these additional parameters, cluster size, cell radius and the power level at which the re-used frequencies are being transmitted at in the adjacent cluster, as part of the system information elements which come in the BCCH data blocks that we had seen earlier. Knowledge of the same will enable the UE, using services of its DSP, to compute what the reuse distance is and thereby estimate the fading or degradation percent for that reused frequency.

(6.2.4) A_17: This action serves to perform some house keeping work for the battery-saving mechanism and helps the invention implementation to work smoothly. This action checks the state variable battery_save_on. This state variable is switched "ON" or "OFF" by the state S_06. If the wireless device has arrived into this state S_05 when the state variable battery save on is "ON", it is an indication that the battery-saving mechanism was on-going and the wireless device just now dissatisfied the scan suspension criterion. This action will reset certain running data store parameters and set/unset certain other conditions in this state machine, such as to ensure a smooth operational flow of the algorithm. The chief aim of this action to ensure that the wireless device, which has resorted to normal behaviour, completes monitoring of the entire neighbor cell list at least once and ensures that the top six cell's BSIC is decoded before invoking the battery-save process again. It can be mentioned, at this point, that the UE will set certain state variables which will cause the condition C_05, of state S_03, to evaluate to FALSE until a fresh wrap around is made on the entire neighbor cells.

```
If (battery_save_on is "ON")
{
    1: reset the state variable battery_save_on to "OFF"
    2: reset the time tick counter of running data store to 0, since the
battery-save process is stopped. (time_tick_count = 0)
    3: reset additional state variables such that the condition C_05 of
state S_03 evaluates to FALSE and the wireless device resorts to a
```

-continued

```
full scan of the entire neighbor cell list at least once and re-verifies the
BSIC of the top six cells forcefully, ignoring the second-level optimization
technique of action A_16 once.
}
Else
{
    Do nothing the wireless device was not in the process of battery-
saving and this state was reached as normal behaviour of the wireless
device
}
```

(6.2.5) A_18: This action serves to check if the wireless device can make a re-selection to a better neighboring cell. Reaching this state S_05 is an indication that the battery-saving process is not ongoing or was just relinquished and the wireless device has resorted back to its greedy behaviour of taking shelter from the best possible cell all the time. This action, will evaluate the outcome of the action A_15, and check if there is any cell in the top 6 list which is better than the current cell. If it finds any cell or a plurality of contending cells, the wireless device will initiate the process of cell reselection. As an embodiment of invention, and claimed thereby as a third level of optimization, the wireless device will look for the presence of the most optimum cell in the top 6 cell by doing a weighted comparison, based on the received signal level and the MS_TXPWR_MAX_CCH, of all the top 6 cells with the current serving cell. As an example, we can assume the weights to be 'X' and '1.25X' for MS_TXPWR_MAX_CCH and received signal level respectively. 'X' is a generic constant to be chosen. The generic process, without imposing restrictions on any alternate process by anyone skilled in this art, is shown below:

Let the top six, sorted in descending order of received signal strength only, neighboring cells have their received signal levels, represented as 0 . . . 63, as follows: 41 (−70 dbM), 40 (−7 dbM), 38 (−73 dbM), 38 (−73 dbM), 32 (−79 dbM), and 31 (−80 dbM).

Let the serving cell's signal level be 39 (−72 dBm). Let, also, be the MS_TXPWR_MAX_CCH of the top 6 neighbor cells as follows: 30 dBm, 26 dBm, 31 dBm, 32 dBm, 33 dBm and 25 dBm. We are assuming that the wireless device is power class 4 which has the capability to transmit a maximum power of 33 dBm. In this example, the top 2nd and top 6th cells have the minimum transmission power requirements.

In conventional systems, the wireless device will find that the serving cell's signal level has gone down and will evaluate C1/C2 criterion for the neighboring cells. The top cell, having the highest received signal power, will be the natural choice, out of the plurality, even though the MS_TXPWR_MAX_CCH is pretty high for that cell.

According to the present invention, the top six yields neighboring cells indicate the following weighted received signal level, based on the following Equation (4):

$$[(Signal\ Level)*1.5X-(MS\_TXPWR\_MAX\_CCH)*X] \quad (4)$$

Table 3 of top 6 cells, in sorted order:

Cell 1: −70 * 1.5X − 30 * X = −135X
Cell 2: −71 * 1.5X − 26 * X = −132.5X
Cell 3: −73 * 1.5X − 31 * X = −140X
Cell 4: −73 * 1.5X − 32 * X = −141.5X
Cell 5: −79 * 1.5X − 33 * X = −151.5X
Cell 6: −80 * 1.5X − 25 * X = −145X This list is now sorted on the basis of weighted received signal level and we arrive at the new top six cell list, as shown below:

Table 4 of top six cells, in weighted sorting order:

| |
|---|
| Cell 2: −71 * 1.5X − 26 * X = −132.5X |
| Cell 1: −70 * 1.5X − 30 * X = −135X |
| Cell 3: −73 * 1.5X − 31 * X = −140X |
| Cell 4: −73 * 1.5X − 32 * X = −141.5X |
| Cell 6 −80 * 1.5X − 25 * X = −145X |
| Cell 5: −79 * 1.5X − 33 * X = −151.5X |

We can see that the top 2nd cell has now acquired become the top cell and would be the most optimum cell for re-selection. We can see that the MS_TXPWR_MAX_CCH was the lowest (25) for the cell 6 in Table 3. But the received signal level was too low and hence it could not become the most optimum cell.

According to the present invention, the wireless device will now use the neighbor cell list of Table 4 and perform the C1/C2 criteria to evaluate if cell re-selection is required. The invention does not modify the C1/C2 criteria at all, but attempts to modify the top six list based only on a weighted comparison.

(6.3) Conditional Checks, C_08, C_09:

Reaching this state is an indication that battery-saving process is not on-going or was just relinquished and the wireless device is looking for opportunities of cell re-selection.

C_08 is satisfied if the outcome of the action A_18 indicates that a cell reselection is required. This decision is derived at by evaluating C1/C2 criteria. The wireless device transitions to state S_07 and attempts to move into the new cell.

C_09 evaluates to TRUE if the outcome of A_18 indicates that no cell-reselection is required. The wireless device falls back to the most stable state of the system, S_02.

(7) S_06 or "Battery-saving . . . in Progress" State:

(7.1) Description of State, S_06:

This is a transient state in the system and is reached when the scan suspension criterion of state S_04 evaluates to TRUE, thereby satisfying the condition C_06. Whenever this state is reached for the first time, it updates the state variable, battery_save_on, to "ON" in the states S_03, S_05 and S_06, wherever it is being used. Additionally, this state starts updating the running data store parameter time_tick_count to track the duration the battery-save mechanism has been executing un-interrupted. The important thing to note about this transient state is that it defaults back to state S_02 very fast, where the RF and other peripherals are shut off and battery is saved. Unlike S_05, which wastes battery power by performing neighbor cell monitoring and BSIC verification, etc., this state does nothing at all and takes the wireless device back to the stable state S_02 almost instantly. Additionally, this state suppresses the greedy behaviour of the wireless device and avoids all opportunities of cell re-selection by closing the reselection window and BSIC re-verification.

(7.2) Associated Actions, A_19, A_20:

(7.2.1) A_19: This action serves to track the time elapsed since the last time the neighbor cell database was updated. Basically, these action increments the running parameter time_tick_count to track the duration the battery-save mechanism has been executing without any interruption. This parameter controls the maximum time the battery-save mechanism can execute without making a forced-update of the neighbor cell database. The corresponding system threshold parameter for this is MAX_STALE_NCELL_DATA_TIMER.

(7.2.2) A_20: This action serves to inform all the related modules that the battery-save mechanism has initiated by updating the respective state variable in the states S_03, S_05 and S_06. This action sets a value of "ON" to the state variable battery_save_on in all the three states. Additionally, this state performs a very important aspect of the invention, which is the continuous-feedback processing. At the completion of every 15 seconds or whatever the value of averaging_ duration parameter of data collection store is, this action will process all the stored data in the data collection module and analyze them. Based on the analysis, this action will derive what the air-interface had been in the past averaging duration. The decision could be one of the following: "worst", "bad", "good", "very good" or "excellent". Furthermore, based on the decision and the past data, this action will apply standard mathematical interpolation/extrapolation methods to predict the future service conditions, the future being the duration until the next averaging duration. Based on the results of the interpolation, the wireless device will try to fine tune the limits of the threshold parameters contained in session data store to achieve higher or lower gains from the battery-save process. If the future is predicted to be "excellent", the wireless device will set the extreme thresholds to its session parameters. For example, the wireless device will increase the MAX_STALE_NCELL_DATA_TIMER from 2 minutes to 5 minutes, mentioned for the sake of an example, if the prediction is "excellent" or bring it down from 4 minutes to 2 minutes if the prediction is "bad" or "good". Any implementer of ordinary skill in the art can modify more than one of the threshold parameters, based on the output of the interpolation method to achieve higher degree of feedback control.

(7.3) Conditional Check, "Fall Through":

This state defaults to state S_02 after completion of all the associated actions.

(8) S_07 or "Re-selection Required?" State:

(8.1) Description of State, S_07:

This state is reached on satisfying the condition C_08 where the state S_05 realizes the need for a cell re-selection. This state performs exit procedure from the current cell, resets the battery-save mechanism and tries to perform camping on the new cell. On completion of the exit procedures, this state transitions to the start of the state machine, S_00.

(8.2) Associated Actions, A_21:

(8.2.1) A_21: This action serves to perform all the exit procedures from the current cell. Typically, this action resets the battery-saving mechanism and stops the camping on the current cell.

(8.3) Conditional Checks, C_10:

On completing the action A_21, this condition is satisfied and the wireless device shifts to state S_00 and initializes the whole procedure once again on the new cell.

The above description illustrates the implementation procedure of the invention and describes the rationale behind selection of the thresholds.

The Present Invention provides numerous benefits and advantages, such as:

1. Optimal Improvement of Standby Life with No Reselection Disorders

The obvious effect/advantage of this invention is that it improves the overall battery life of a basic GSM UE by optimizing the RF transmission and RF reception factors. The invention would result in more standby time of the UE, which would result in a better end-user experience, manifested as lowered frequency of battery re-charge. This invention capitalizes on the UE's ability to meet the process goal and not on the ever-fluctuating, RF-receiver dependent raw signal parameters. As a result, this invention will generate better battery-efficient results, at the same time with minimal impact to the reselection performance due to a very strong scan suspension criterion. Furthermore, this invention dictates several associated behaviour, like abandoning the greediness for cell re-selection, when the scan suspension is in progress, leading to higher battery-saving and a highly robust technique. Moreover, this invention offers a generic solution to reduction of battery consumption independent of the RF-antenna sensitivity and the UE make and manufacturer.

2. Improved Dedicated-mode Time

Furthermore, the invention also results in improved talk-time of the UE due to the UE's effort to re-select to that cell which offers higher tolerance to received signals from the UEs at the cell's antenna. The UE tries immensely to re-select to that cell which allows the UE to make RF transmissions at a lower power.

3. Market Differentiation

This invention can also be marketed to provide a new end-user option in the Power Management applications of the wireless device, which the user can turn on or off, and could serve for market differentiation. There are times when the end user is running very low on battery and is expecting an urgent call from someone. The user, under such scenario, choose the extreme optimization thresholds of the invented scan suspension criterion to achieve the maximum battery saving.

4. Three-Tier Result Oriented Mechanism:

As described above, the present invention outlines a three-tier scheme, triggered sequentially at the failure of the preceding one, which provides best ways to mitigate the power consumption.

It will also be obvious to those skilled in the art that other control methods and apparatuses can be derived from the combinations of the various methods and apparatuses of the present invention as taught by the description and the accompanying drawings and these shall also be considered within the scope of the present invention. Further, description of such combinations and variations is therefore omitted above. It should also be noted that the host for storing the applications include but are not limited to a microchip, microprocessor, handheld communication device, computer, rendering device or a multi function device.

Although the present invention has been fully described in connection with the preferred embodiments thereof with reference to the accompanying drawings, it is to be noted that various changes and modifications are possible and are apparent to those skilled in the art. Such changes and modifications are to be understood as included within the scope of the present invention, as defined by the appended claims.

What is claimed is:

1. A system for improving battery life of a mobile terminal according to an optimization mechanism for suspending neighbor-cell scanning, the system having a mobile terminal comprising:
   a Digital Signal Processor for processing received signals at a corresponding receiving antenna and offering estimates of a received signal level and quality;
   a Radio Frequency (RF) module that is powered off for a definite period of time and that wakes up at a predetermined interval to listen to paging messages transmitted thereto;
   a Downlink Signaling Counter (DSC) that increases a count when the mobile terminal successfully decodes a paging message and that decreases the count when the mobile terminal fails to decode the paging message; and
   a neighbor cell monitor for comparing predetermined values with the DSC and, according to the comparison result, either scanning neighbor cells or not scanning the neighbor cells.

2. The system as claimed in claim 1, wherein the mobile terminal reduces scanning of neighbor cells and closes a window of reselection, thereby blocking cell reselections, so long as the mobile terminal senses that it has not grossly compromised with a process goal of reading periodic network paging messages.

3. The system as claimed in claim 2, wherein the system avoids performing periodic Base Station Identity Code (BSIC) re-verification while scan suspension criterion is satisfied.

4. The system as claimed in claim 1, wherein the mobile terminal maintains two floor values of a battery-save mechanism to predict quality of service and make decisions as to the quality of service.

5. The system as claimed in claim 1, wherein the mobile terminal pays significant attention to reselection performance, an intrinsic aspect of robust scan suspension criterion, and adaptively modulates optimization effectiveness or sometimes turn off the optimization mechanism to ensure that the mobile terminal does not adversely compromise the reselection performance.

6. The system as claimed in claim 5, wherein, when the mechanism is turned off, secondary optimization techniques are triggered.

7. The system as claimed in claim 1, wherein the mobile terminal maintains a time-based counter to ascertain how long the mobile terminal, during a period of time when a battery-save mechanism is in progress, has operated since updating a database of the neighbor cells.

8. The system as claimed in claim 1,
   wherein the mobile terminal maintains a minimum value for the DSC, whose running value has to be absolute minimum, but greater than zero.

9. The system as claimed in claim 1, wherein the mobile terminal adaptively maintains a minimum value of received signal level and signal-to-noise ratio for a serving cell, based on past history of success, whose running values are greater than a threshold value.

10. The system as claimed in claim 2, wherein the mobile terminal maintains a running count of a successive failure in decoding of paging data and thereby failing to meet the process goal.

11. The system as claimed in claim 10, wherein the mobile terminal maintains a maximum successive failure count, which is chosen based on a paging interval.

12. The system as claimed in claim 1, wherein the mobile terminal maintains timer to ascertain a duration during which to maintain stale neighbor cell data.

13. The system as claimed in claim 2, wherein the mobile terminal maintains a running count of fluctuation in a success rate of decoding paging data and thereby fails to conform with the process goal.

14. The system as claimed in claim 1, wherein the mobile terminal maintains a maximum threshold for a running fluctuation count.

15. The system as claimed in claim 3, wherein the mobile terminal defines a new scan suspension criterion which determines if the mobile terminal can proceed with battery saving by suspending scanning of the neighbor cells and thereby closes the reselection window and circumvents BSIC re-verification.

16. The system as claimed in claim 1, wherein the mobile terminal stores air interface data over a period of time and analyzes the same to ascertain how an air interface condition of a last averaging duration, making use of analysis results to extrapolate the air interface condition for a next averaging duration and providing feedback to said system, whereupon said system adaptively re-evaluates all threshold parameters and re-adjusts performance of a scan suspension criterion.

17. The system as claimed in claim 1, wherein a network (NW) empowers the mobile terminal to make more intelligent decisions by sending details about NW configuration, using which, said system avoids indulging in BSIC re-verification of a co-channel reused frequency, used in an adjacent cluster, if signal degradation of the reused frequency is too high to entail it to become a member of said system's top six neighbor cell list.

18. The system as claimed in claim 1, wherein the mobile terminal attempts to conserve battery power in a non-idle mode by re-selecting a neighbor cell from a plurality of cells to allow the terminal to initiate an active call connection at a lower RF TX power compared to other cells.

19. The system as claimed in claim 18, wherein the mobile terminal's re-selection decision is made on a weighted comparison of received signal levels and a cell's tolerance to RF transmissions from the mobile terminal.

* * * * *